US009918302B2

(12) United States Patent
Yerramalli et al.

(10) Patent No.: US 9,918,302 B2
(45) Date of Patent: Mar. 13, 2018

(54) TECHNIQUES FOR MANAGING TRANSMISSIONS IN AN UNLICENSED RADIO FREQUENCY SPECTRUM BAND

(71) Applicant: QUALCOMM Incorporated, San Diego, CA (US)

(72) Inventors: Srinivas Yerramalli, San Diego, CA (US); Xiaoxia Zhang, San Diego, CA (US); Tao Luo, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 14/959,659

(22) Filed: Dec. 4, 2015

(65) Prior Publication Data

US 2016/0174214 A1 Jun. 16, 2016

Related U.S. Application Data

(60) Provisional application No. 62/091,345, filed on Dec. 12, 2014.

(51) Int. Cl.
*H04W 72/04* (2009.01)
*H04W 28/06* (2009.01)
(Continued)

(52) U.S. Cl.
CPC ..... *H04W 72/0413* (2013.01); *H04J 13/0048* (2013.01); *H04L 5/0026* (2013.01);
(Continued)

(58) Field of Classification Search
None
See application file for complete search history.

(56) References Cited

U.S. PATENT DOCUMENTS 8,958,494 B2 * 2/2015 Beluri ............... H04B 7/0417
375/260
2004/0081131 A1 * 4/2004 Walton ............. H04B 7/0421
370/344
(Continued)

FOREIGN PATENT DOCUMENTS

EP 2642814 A1 9/2013

OTHER PUBLICATIONS

ISA/EPO, International Search Report and Written Opinion of the International Searching Authority, Int'l Appl. No. PCT/US2015/064482, dated Jun. 1, 2016, European Patent Office, Rijswijk, NL, 18 pgs.
(Continued)

*Primary Examiner* — Brian Roberts
(74) *Attorney, Agent, or Firm* — Clint R. Morin; Holland & Hart

(57) ABSTRACT

A first method for wireless communications may comprise determining sizes of payloads of user equipment (UEs), determining whether to multiplex the payloads of the UEs based on the sizes of the payloads, and allocating codes or cyclic shifts to the UEs to transmit the payloads on a single interlace of resources. A second method for wireless communications may comprise determining a first code or a first cyclic shift used for a first transmission using an interlace of resources, and allocating second codes or second cyclic shifts to UEs for a second transmission, where the second transmission may be multiplexed with the first transmission on the interlace of resources. A third method for wireless communications may comprise allocating a first interlace of resources for a first transmission for occupying an unlicensed radio frequency spectrum band, and allocating a second interlace of resources, occupied by a base station, for a second transmission.

28 Claims, 16 Drawing Sheets

(51) Int. Cl.
*H04J 13/00* (2011.01)
*H04W 76/04* (2009.01)
*H04W 72/12* (2009.01)
*H04L 5/00* (2006.01)
*H04L 5/14* (2006.01)

(52) U.S. Cl.
CPC .......... *H04L 5/0046* (2013.01); *H04L 5/0091* (2013.01); *H04W 28/06* (2013.01); *H04W 76/046* (2013.01); *H04L 5/001* (2013.01); *H04L 5/006* (2013.01); *H04L 5/0032* (2013.01); *H04L 5/14* (2013.01); *H04W 72/1252* (2013.01)

(56) References Cited

U.S. PATENT DOCUMENTS

| | | | | |
|---|---|---|---|---|
| 2008/0095110 A1* | 4/2008 | Montojo | ............... | H04L 5/0053 370/330 |
| 2011/0310853 A1* | 12/2011 | Yin | ....................... | H04L 1/0009 370/335 |
| 2013/0114570 A1 | 5/2013 | Park et al. | | |
| 2014/0341018 A1 | 11/2014 | Bhushan et al. | | |
| 2016/0192385 A1* | 6/2016 | Tooher | ................. | H04L 5/0051 370/336 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)," 3GPP TS 36.211 v12.0.0 (Dec. 2013) Technical Specification, Dec. 2013, pp. 1-120, 3rd Generation Partnership Project.

ISA/EPO, Partial International Search Report of the International Searching Authority, Int'l Appl. No. PCT/US2015/064482, dated Mar. 21, 2016, European Patent Office, Rijswijk, NL, 7 pgs.

Love et al., "16: Uplink Physical Channel Structure," LTE—The UMTS Long Term Evolution: From Theory to Practice, Second Edition, (ed. Sesia et al.), Aug. 2011, 28 pgs., ISBN 978-0-470-66025-6, John Wiley & Sons, Ltd., UK.

* cited by examiner

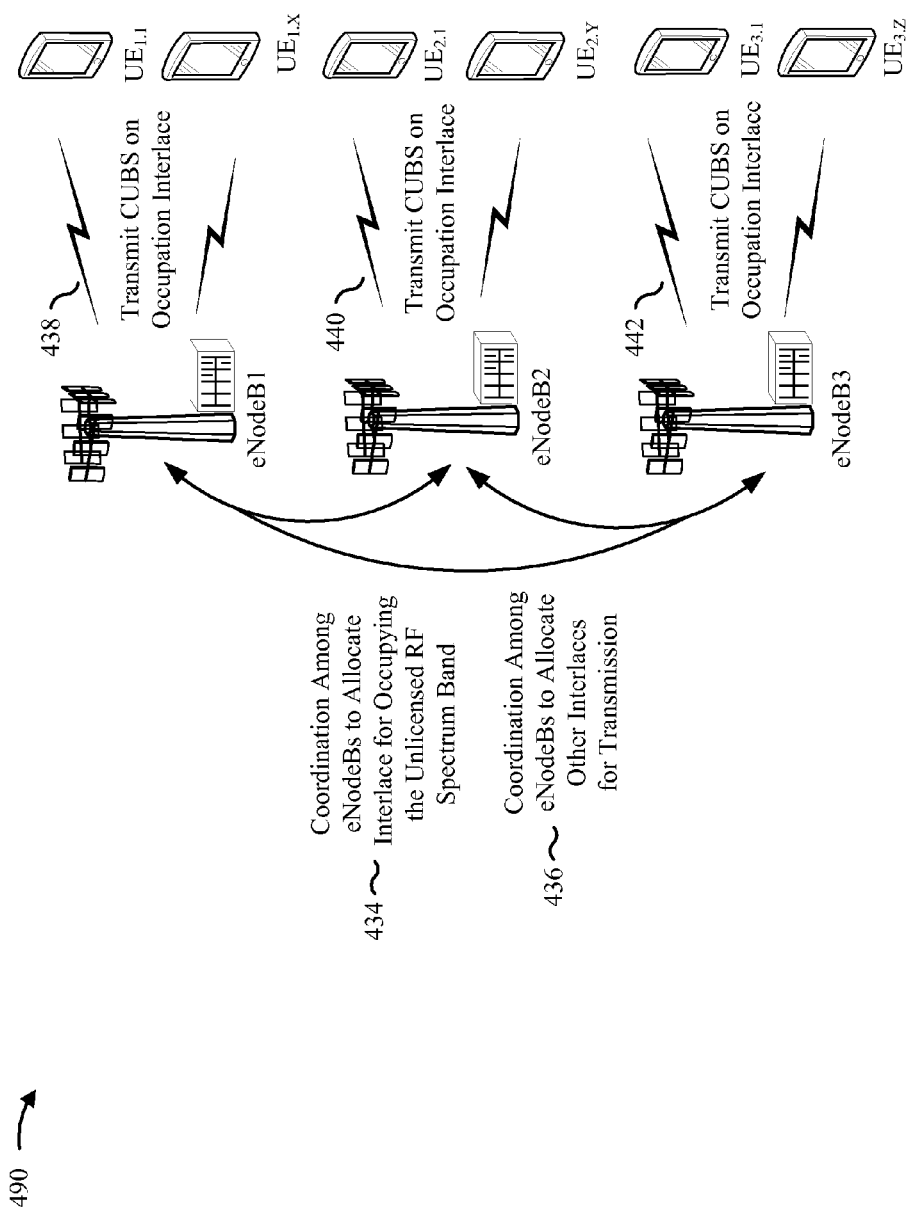

TECHNIQUES FOR MANAGING TRANSMISSIONS IN AN UNLICENSED RADIO FREQUENCY SPECTRUM BAND

CROSS REFERENCES

The present application for patent claims priority to U.S. Provisional Patent Application No. 62/091,345 by Yerramalli et al., entitled "Techniques For Managing Transmissions In An Unlicensed Radio Frequency Spectrum Band," filed Dec. 12, 2014, assigned to the assignee hereof, and expressly incorporated by reference herein.

BACKGROUND

Field of the Disclosure

The present disclosure, for example, relates to wireless communication systems, and more particularly to techniques for managing transmissions in an unlicensed radio frequency spectrum band.

Description of Related Art

Wireless devices may communicate over an unlicensed radio frequency spectrum band using one or more radio access technologies, such as a long term evolution radio access technology, a Wi-Fi radio access technology, or the like. An unlicensed radio frequency spectrum band may refer to a radio frequency spectrum band that is open for shared use by any device that complies with regulatory agency rules for communicating via the radio frequency spectrum band. In contrast with most licensed radio frequency spectrum band usage, users of an unlicensed radio frequency spectrum band do not, for example, have regulatory protection against radio interference from devices of other users. In other words, devices that use the unlicensed radio frequency spectrum band must, for example, accept any radio interference caused by other devices that use the unlicensed radio frequency spectrum band.

SUMMARY

In some aspects, a method for wireless communication may include determining sizes of payloads of one or more user equipment (UEs). The method may include determining whether to multiplex the payloads of the one or more UEs based on the sizes of the payloads. The method may include allocating at least one of, one or more codes or one or more cyclic shifts to the one or more UEs to transmit the payloads on a single interlace of resources based on the determination to multiplex the payloads of the one or more UEs.

In some aspects, a base station for wireless communication may determine sizes of payloads of one or more user equipment (UEs). The base station may determine whether to multiplex the payloads of the one or more UEs based on the sizes of the payloads. The base station may allocate at least one of one or more codes or one or more cyclic shifts to the one or more UEs to transmit the payloads on a single interlace of resources based on the determination to multiplex the payloads of the one or more UEs.

In one example, the determination as to whether to multiplex the payloads based on the sizes of the payloads may include determining whether the sizes of the payloads satisfy a payload size threshold.

In one aspect, the one or more processors, when allocating at least one of one or more codes or one or more cyclic shifts to the one or more UEs, may allocate at least two codes or cyclic shifts to a single UE, of the one or more UEs to transmit corresponding payloads using the at least two codes or cyclic shifts.

In one aspect, allocating the at least one of the one or more codes or the one or more cyclic shifts to the one or more UEs may include allocating at least two codes or cyclic shifts to a single UE, of the one or more UEs, to transmit corresponding payloads using at least two codes or cyclic shifts. The payloads may be code division multiplexed on the single interlace of resources using at least two codes of the one or more codes, or the payloads may be multiplexed on the single interlace of resources using at least two cyclic shifts of the one or more cyclic shifts, or a combination thereof.

In some aspects, the single interlace of resources may comprise a plurality of uplink resources that are structured to allow each UE, of the one or more UEs, to transmit bits in the single interlace of resources, using the at least one of the one or more codes or the one or more cyclic shifts. The one or more codes may be one or more Walsh codes.

In one example, a transport block size (TBS) based on a modulation and coding scheme (MCS) and a total quantity of the at least one of the one or more codes or the one or more cyclic shifts may be determined.

In some aspects, the single interlace of resources may comprise a plurality of uplink resources that are structured using physical uplink control channel (PUCCH) format 2, or physical uplink control channel (PUCCH) format 3, or a combination thereof. In one example, allocating the at least one of the one or more codes or the one or more cyclic shifts to the one or more UEs may comprise instructing the one or more UEs to transmit the payloads on the single interlace of resources using a downlink grant. In one example, cyclic redundancy check (CRC) information, associated with transmitting a payload, of the payloads, may include a quantity of bits that is less than twenty-four bits.

In some aspects, the single interlace of resources may be included in a channel of an unlicensed spectrum.

In some aspects, a non-transitory computer-readable medium may include one or more instructions for wireless communication that, when executed by one or more processors of a base station, cause the one or more processors to determine sizes of payloads of one or more user equipment (UEs). The one or more instructions may cause the one or more processors to determine whether to multiplex the payloads of the one or more UEs based on the sizes of the payloads. The one or more instructions may cause the one or more processors to allocate at least one of one or more codes or one or more cyclic shifts to the one or more UEs to transmit the payloads on a single interlace of resources based on the determination to multiplex the payloads of the one or more UEs.

In some aspects, an apparatus for wireless communication may include means for determining sizes of payloads of one or more user equipment (UEs). The apparatus may include means for determining whether to multiplex the payloads of the one or more UEs based on the sizes of the payloads. The apparatus may include means for allocating at least one of one or more codes or one or more cyclic shifts to the one or more UEs to transmit the payloads on a single interlace of resources based on the determination to multiplex the payloads of the one or more UEs.

In some aspects, a method for wireless communication may include determining a first code or a first cyclic shift used for a first transmission, wherein the first transmission may be transmitted using an interlace of resources. The method may include allocating a plurality of second codes or a plurality of second cyclic shifts to one or more user equipment (UEs) for a second transmission, wherein the second transmission may be multiplexed with the first transmission on the interlace of resources.

In some aspects, allocating the plurality of second codes or the plurality of second cyclic shifts to the one or more UEs for the second transmission may comprise, instructing a UE, of the one or more UEs, to transmit physical uplink control channel (PUCCH) information or to transmit physical uplink shared channel (PUSCH) on an uplink resource included in the interlace of resources.

In one example, the first code or the first cyclic shift for transmission of channel occupancy information on the interlace of resources may be allocated, and, one or more UEs may be instructed to transmit the channel occupancy information on the interlace of resources using the first code or the first cyclic shift. In another example, a UE of the one or more UEs, may be instructed to transmit channel occupancy information on a first subset of uplink resources of the interlace of resources, and a second subset of uplink resources (different from the first subset of uplink resources) of the interlace of resources may be allocated to the UE for transmission of information.

In one aspect, instructing the UE to transmit the channel occupancy information on the first subset of uplink resource may comprise, instructing the UE to transmit the channel occupancy information on the first subset of uplink resources using the first code or the first cyclic shift. In another aspect, instructing the UE to transmit the channel occupancy information on the first subset of uplink resource may cause a bandwidth requirement, associated with a channel that includes the interlace of resources, to be satisfied.

In one example, uplink resources, of the interlace of resources, may be structured using PUCCH format 2, or PUCCH format 3, or a combination thereof.

In some aspects, the interlace of resources may be included in a channel of an unlicensed spectrum or in a channel associated with a long term evolution (LTE) network.

In some aspects, a base station for wireless communication may determine a first code or a first cyclic shift used for a first transmission, wherein the first transmission may be transmitted using an interlace of resources. The base station may allocate a plurality of second codes or a plurality of second cyclic shifts to one or more user equipment (UEs) for a second transmission, wherein the second transmission may be multiplexed with the first transmission on the interlace of resources.

In some aspects, a non-transitory computer-readable medium may include one or more instructions for wireless communication that, when executed by one or more processors of a base station, cause the one or more processors to determine a first code or a first cyclic shift used for a first transmission, wherein the first transmission may be transmitted using an interlace of resources. The one or more instructions may cause the one or more processors to allocate a plurality of second codes or a plurality of second cyclic shifts to one or more user equipment (UEs) for a second transmission, wherein the second transmission may be multiplexed with the first transmission on the interlace of resources.

In some aspects, an apparatus for wireless communication may include means for determining a first code or a first cyclic shift used for a first transmission, wherein the first transmission may be transmitted using an interlace of resources. The apparatus may include means for allocating a plurality of second codes or a plurality of second cyclic shifts to one or more user equipment (UEs) for a second transmission, wherein the second transmission may be multiplexed with the first transmission on the interlace of resources.

In some aspects, a method for wireless communication may include allocating a first interlace of resources for a first transmission, wherein the first transmission may be for occupying an unlicensed radio frequency spectrum band. The method may include allocating at least a second interlace of resources for a second transmission, wherein the at least second interlace of resources may be occupied by a base station of a plurality of base stations.

In some aspects, allocating the at least second interlace of resources may comprise, determining that an interlace of resources has been allocated to a first base station of the plurality of base stations, and allocating another interlace of resources to a second base station of the plurality of base stations, the another interlace of resources which may be different than the interlace of resources.

In some aspects, a base station for wireless communication may allocate a first interlace of resources for a first transmission, wherein the first transmission may be for occupying an unlicensed radio frequency spectrum band. The base station may allocate at least a second interlace of resources for a second transmission, wherein the at least second interlace of resources may be occupied by a base station of a plurality of base stations.

In some aspects, a non-transitory computer-readable medium may include one or more instructions for wireless communication that, when executed by one or more processors of one or more base stations, cause the one or more processors to allocate a first interlace of resources for a first transmission, wherein the first transmission may be for occupying an unlicensed radio frequency spectrum band. The one or more instructions may cause the one or more processors to allocate at least a second interlace of resources for a second transmission, wherein the at least second interlace of resources may be occupied by a base station of a plurality of base stations.

In some aspects, an apparatus for wireless communication may include means for allocating a first interlace of resources for a first transmission, wherein the first transmission may be for occupying an unlicensed radio frequency spectrum band. The apparatus may include means for allocating at least a second interlace of resources for a second transmission, wherein the at least second interlace of resources is occupied by a base station of a plurality of base stations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4C shows a diagram illustrating an example of allocating a first interlace of resources for a first transmission associated with occupying an unlicensed radio frequency spectrum band, and allocating a second interlace of resources for a second transmission by one or more base stations, in accordance with various aspects of the present disclosure;

DETAILED DESCRIPTION

Figure 1:
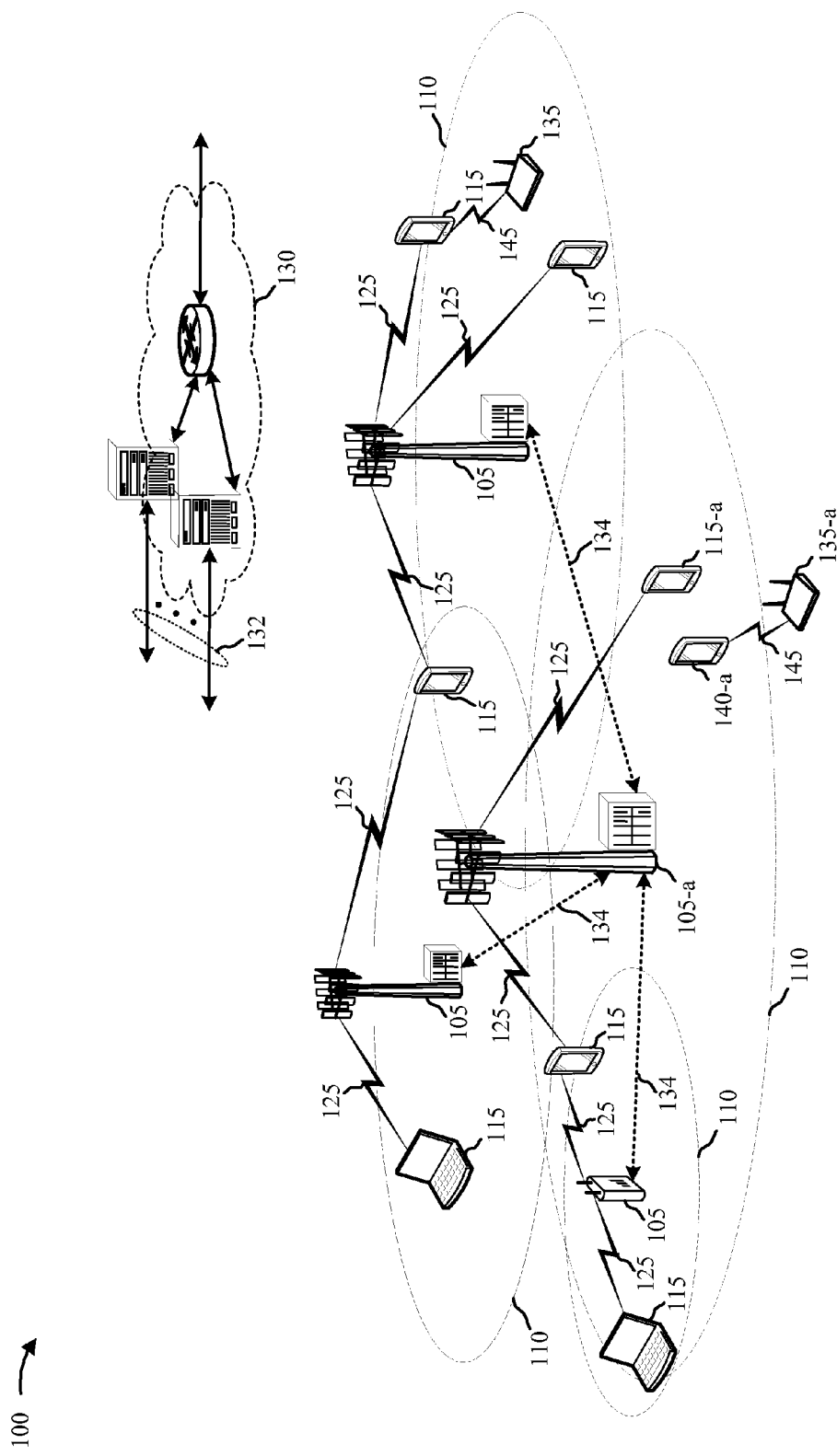
FIG. 1 shows a block diagram of a wireless communication system, in accordance with various aspects of the present disclosure.

The following detailed description of example aspects refers to the accompanying drawings. The same reference numbers in different drawings may identify the same or similar elements.

Techniques are described in which an unlicensed radio frequency spectrum band is used for at least a portion of communications over a wireless communication system. In some examples, the unlicensed radio frequency spectrum band may be used by base stations and user equipments (UEs) of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed radio frequency spectrum band may be used by the cellular network in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

A transmission in an unlicensed radio frequency spectrum band (e.g., a 5 gigahertz (GHz) unlicensed radio frequency spectrum band) may be required to occupy a minimum threshold amount of bandwidth (e.g., 80% of a total bandwidth) in a both an uplink direction (e.g., from a UE to a base station) and a downlink direction (e.g., from a base station to a UE).

With respect to transmissions in the uplink direction, the uplink transmission may use a plurality interlaces of resources (e.g., each interlace of resources may include a plurality of uplink resources (e.g., resource blocks (RBs)) that may be distributed across an unlicensed radio frequency bandwidth) to satisfy the minimum threshold amount of bandwidth requirement. For example, a bandwidth of the unlicensed radio frequency spectrum band may be 20 megahertz (MHz), and the 20 MHz band may be divided into 100 uplink resources (e.g., RBs) for a period of time (e.g., 1 millisecond (ms) subframe). As such, in this example, 100 uplink resources may be available for uplink transmissions during the period of time. The uplink resources (e.g., 100 uplink resources) may be divided into ten interlaces of resources. Thus, each interlace of resources may include ten uplink resources that are distributed across the bandwidth (e.g., a first interlace of resources may include a first resource block, an eleventh resource block, a twenty-first resource block, a thirty-first resource block, a forty-first resource block, a fifty-first resource block, a sixty-first resource block, a seventy-first resource block, an eighty-first resource block, and a ninety-first resource block; a tenth interlace of resources may include a tenth resource block, a twentieth resource block, a thirtieth resource block, a fortieth resource block, a fiftieth resource block, a sixtieth resource block, a seventieth resource block, an eightieth resource block, a ninetieth resource block, and a one hundredth resource block, etc.).

A UE may be allocated an interlace of resources for transmissions of small amounts of information in the uplink direction. As such, continuing the above example, the UE may be allocated the interlace of resource that may include ten uplink resources (e.g., RBs) for an uplink transmission. However, such an allocation may be inefficient and/or undesirable (e.g., in terms of UE power consumption, in terms of efficient usage of uplink resource, etc.) when the UE is transmitting a small amount of information. For example, allocating an interlace of resources that may include ten uplink resources (e.g., an entire interlace) to the UE may be inefficient and/or undesirable when the UE may need a few uplink resources (e.g., one uplink resource or two uplink resources) for a transmission that includes a small amount of information (e.g., a small amount of information on the physical uplink shared channel (PUSCH) and/or small amount of information on the physical uplink control channel (PUCCH)).

Aspects of the present disclosure described herein may allow a plurality of UEs to efficiently use uplink resources of an interlace of resources, in an unlicensed radio frequency spectrum band, by allocating codes and/or cyclic shifts to the plurality of UEs such that transmissions of small amounts of information of the plurality of UEs may be multiplexed (e.g., using the allocated codes and/or cyclic shifts) on an interlace of resources (e.g., a single interlace of resources). In this manner, power consumption of the plurality of UEs may also be reduced.

Similarly, aspects of the present disclosure may also allow a plurality of UEs to efficiently use uplink resources of an interlace of resources by allocating a first code and/or a first cyclic shift of the interlace of resources for transmissions of channel occupancy information (e.g., information that may be discarded, ignored, and/or deleted, etc.) and by allocating other codes and/or other cyclic shifts of the interlace of resources for transmissions of data of the plurality of UEs. Moreover, each UE of the plurality of UEs, may be allocated a subset of resources (e.g., a set of resource blocks) of the interlace of resources. For example, a UE may transmit data in an allocated subset of resources, of the interlace of resources, using a code and/or cyclic shift allocated to the UE, while transmitting channel occupancy information in other resources, of the interlace of resources, using the code and/or cyclic shift allocated for transmissions of channel occupancy information.

With respect to transmissions in the downlink direction, a base station may be configured to transmit on an interlace of resources (e.g., in the manner similar to that described above with regard to a transmission in the uplink direction) in order to satisfy the bandwidth occupancy requirement for the unlicensed radio frequency spectrum band and/or in order to occupy the unlicensed radio frequency spectrum band. A plurality of base stations (e.g., implemented by a public land mobile network (PLMN) operator) may coordinate an allocation of a first interlace of resources of the downlink resources to satisfy the bandwidth occupancy requirement for the unlicensed radio frequency spectrum band and/or in order to occupy the unlicensed radio frequency spectrum band. The plurality of base stations may allocate remaining interlaces of resources of the downlink resources among each other in order to mitigate inter-cell interference. For example, each of the remaining interlaces of resources of the downlink resources may be allocated to each of the plurality of the base stations. One possible technique of coordination between the plurality of base stations may be to implement an inter-cell interference coordination (ICIC) technique. Aspects of the present disclosure described herein may allow downlink resources of an unlicensed radio frequency spectrum band to be efficiently used by a plurality of base stations (e.g., in order to mitigate inter-cell interference) by causing the plurality of base stations to transmit channel occupancy information in an interlace of resources in order to concurrently occupy the unlicensed radio frequency spectrum band and satisfy the bandwidth occupancy requirement for the unlicensed radio frequency spectrum band, and by coordinating allocation of other interlaces of resources among the plurality of base stations.

FIG. 1 shows a block diagram of a wireless communication system 100, in accordance with various aspects of the present disclosure. The wireless communication system 100 may include a cellular network and a Wi-Fi network. The cellular network may include one or more base stations 105, 105-a, one or more UEs 115, 115-a, and a core network 130. The Wi-Fi network may include one or more Wi-Fi access points 135, 135-a and one or more Wi-Fi stations 140, 140-a.

With reference to the cellular network of the wireless communication system 100, the core network 130 may provide user authentication, access authorization, tracking, Internet Protocol (IP) connectivity, and other access, routing, or mobility functions. The base stations 105, 105-a may interface with the core network 130 through backhaul links 132 (e.g., S1, etc.) and may perform radio configuration and scheduling for communication with the UEs 115, 115-a, or may operate under the control of a base station controller (not shown). In various examples, the base stations 105, 105-a may communicate, either directly or indirectly (e.g., through core network 130), with each other over backhaul links 134 (e.g., X2, etc.), which may be wired or wireless communication links.

The base stations 105, 105-a may wirelessly communicate with the UEs 115, 115-a via one or more base station antennas. Each of the base station 105, 105-a sites may provide communication coverage for a respective geographic coverage area 110. In some examples, a base station 105, 105-a may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-a may be divided into sectors making up a portion of the coverage area (not shown). The cellular network may include base stations 105, 105-a of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-a, while the term UE may be used to describe the UEs 115, 115-a. The cellular network may be a Heterogeneous LTE/LTE-A network in which different types of eNBs provide coverage for various geographical regions. For example, each eNB or base station 105, 105-a may provide communication coverage for a macro cell, a small cell, and/or other type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or more (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115, 115-a and the base stations 105, 105-a or core network 130 supporting radio bearers for the user plane data. At the Physical (PHY) layer, the transport channels may be mapped to Physical channels.

The UEs 115, 115-a may be dispersed throughout the wireless communication system 100, and each UE 115, 115-a may be stationary or mobile. A UE 115, 115-a may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-a may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-a and network equipment, including macro eNBs, small cell eNBs, relay base stations, or the like.

The communication links 125 shown in wireless communication system 100 may carry downlink (DL) transmissions from a base station 105, 105-a to a UE 115, 115-a, and/or uplink (UL) transmissions from a UE 115, 115-a to a base station 105, 105-a. The downlink transmissions may also be called forward link transmissions, while the uplink transmissions may also be called reverse link transmissions.

In some examples, each communication link 125 may include one or more carriers, where each carrier may be a signal made up of a plurality of sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, 105-a and/or UEs 115, 115-a may include a plurality of antennas for employing antenna diversity schemes to improve communication quality and reliability between base stations 105, 105-a and UEs 115, 115-a. Additionally or alternatively, base stations 105, 105-a and/or UEs 115, 115-a may employ multiple-input, multiple-output (MIMO) techniques that may take advantage of multi-path environments to transmit a plurality of spatial layers carrying the same or different coded data.

The wireless communication system 100 may support operation on a plurality of cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-a may be configured with a plurality of downlink CCs and one or more uplink CCs for carrier aggregation. Carrier aggregation may be used with both FDD and TDD component carriers.

With reference to the Wi-Fi network of the wireless communication system 100, the Wi-Fi access points 135, 135-a may wirelessly communicate with the Wi-Fi stations 140, 140-a via one or more Wi-Fi access point antennas, over one or more communication links 145. In some examples, the Wi-Fi access points 135, 135-a may communicate with the Wi-Fi stations 140, 140-a using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a Wi-Fi station 140, 140-a may be a cellular phone, a personal digital assistant (PDA), a wireless communication device, a handheld device, a tablet computer, a laptop computer, or the like. In some examples, an apparatus may include aspects of both a UE 115, 115-a and a Wi-Fi station 140, 140-a, and such an apparatus may communicate with one or more base stations 105, 105-a using a first radio access technology (RAT) (e.g., a cellular RAT, or a plurality of cellular RATs), and communicate with one or more Wi-Fi access points 135, 135-a using a second RAT (e.g., a Wi-Fi RAT, or a plurality of Wi-Fi RATs).

In some examples, the base stations 105, 105-a and UEs 115, 115-a may communicate over a licensed radio frequency spectrum band and/or an unlicensed radio frequency spectrum band, whereas the Wi-Fi access points 135, 135-a and Wi-Fi stations 140, 140-a may communicate over the unlicensed radio frequency spectrum band. The unlicensed radio frequency spectrum band may therefore be shared by the base stations 105, 105-a, the UEs 115, 115-a, the Wi-Fi access points 135, 135-a, and/or the Wi-Fi stations 140, 140-a. Because the unlicensed radio frequency spectrum band may be shared by apparatuses operating under different protocols (e.g., different RATs), transmitting apparatuses may contend for access to the unlicensed radio frequency spectrum band.

As an example, the unlicensed radio frequency spectrum band may include one or more radio frequencies (e.g., one or more radio frequency spectrum bands) included in the radio spectrum (e.g., the portion of the electromagnetic spectrum corresponding to radio frequencies, or frequencies lower than approximately 300 GHz). In some aspects, the unlicensed radio frequency spectrum band may include one or more radio frequency spectrum bands that are open for shared use by any device that complies with regulatory agency rules (e.g., associated with a particular country) for communicating via the one or more radio frequency spectrum bands. For example, the unlicensed radio frequency spectrum band may include one or more radio frequencies between approximately 5 GHz and approximately 6 GHz. As a more specific example, the unlicensed radio frequency spectrum band may include one or more radio frequencies between approximately 5.15 GHz and approximately 5.825 GHz.

As another example, the unlicensed radio frequency spectrum band may include one or more radio frequency spectrum bands defined by the United States Federal Communications Commission (FCC) as the Unlicensed National Information Infrastructure (U-NII) radio band. The U-NII radio band may include, for example, a first radio frequency spectrum band between approximately 5.15 GHz and approximately 5.25 GHz (e.g., the U-NII Low band), a second radio frequency spectrum band between approximately 5.25 GHz and approximately 5.35 GHz (e.g., the U-NII Mid band), a third radio frequency spectrum band between approximately 5.47 GHz and approximately 5.725 GHz (e.g., the U-NII Worldwide band), and/or a fourth radio frequency spectrum band between approximately 5.725 GHz and approximately 5.825 GHz (e.g., the U-NII Upper band).

The unlicensed radio frequency spectrum band may be divided into RF channels via which RF communications may be transmitted. For example, the unlicensed radio frequency spectrum band may include one or more channels of approximately 20 MHz bandwidth. Wireless devices (e.g., UE 115, Wi-Fi access point 135, base station 105, etc.) may communicate via an RF channel included in the unlicensed radio frequency spectrum band. For example, a wireless device may communicate via an RF channel using a Wi-Fi radio access technology, an LTE radio access technology, or the like. In some aspects, a wireless device may contend for access to the unlicensed radio frequency spectrum band before sending a transmission via the unlicensed radio frequency spectrum band, as described in more detail elsewhere herein.

Figure 2:
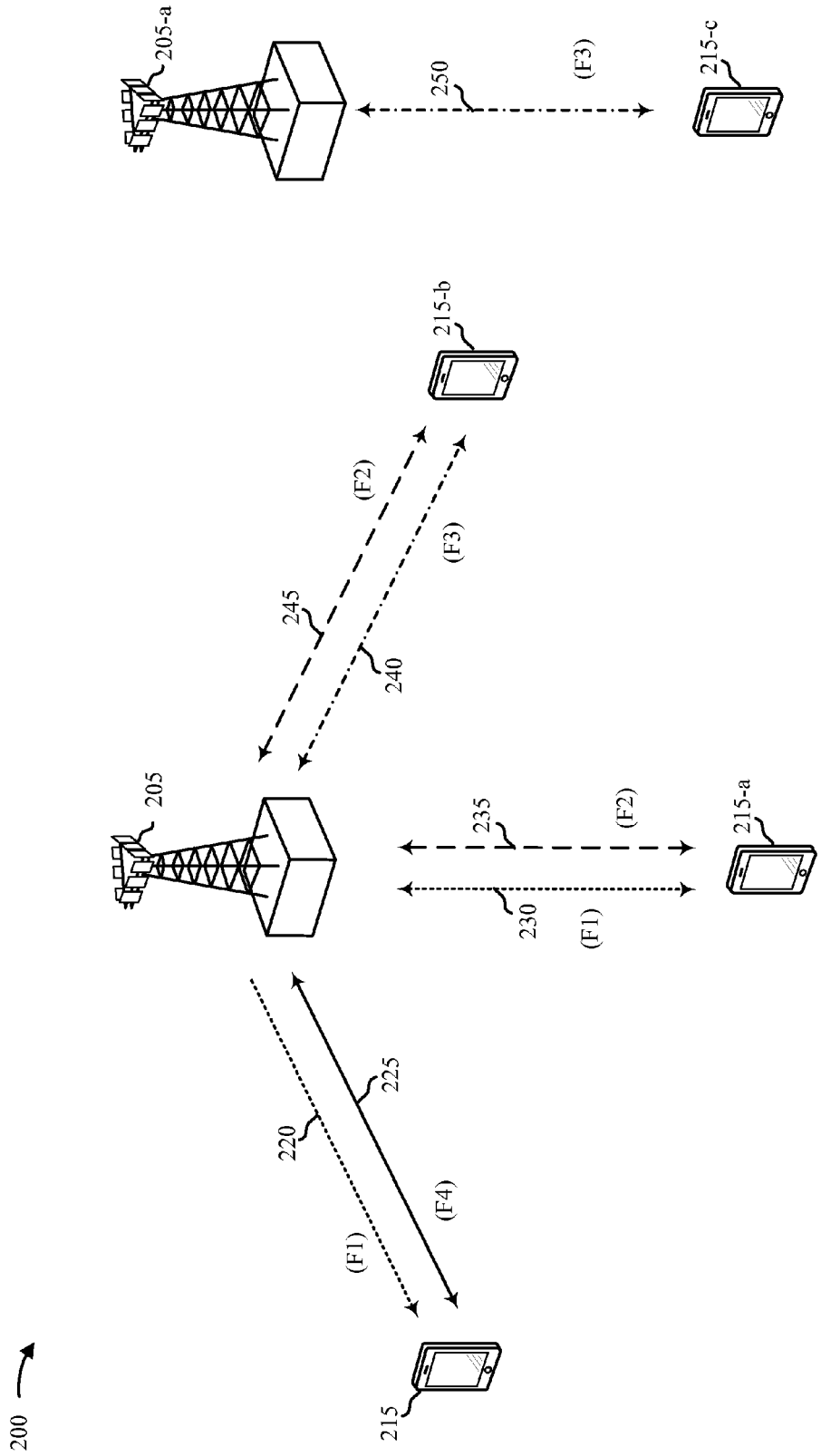
FIG. 2 shows a wireless communication system in which long term evolution (LTE) and/or LTE-Advanced (LTE-A) may be deployed under different scenarios using an unlicensed radio frequency spectrum band, in accordance with various aspects of the present disclosure.

FIG. 2 shows a wireless communication system 200 in which LTE and/or LTE-A may be deployed under different scenarios using an unlicensed radio frequency spectrum band, in accordance with various aspects of the present disclosure. More specifically, FIG. 2 illustrates examples of a supplemental downlink mode (e.g., licensed assisted access mode), a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105, 105-*a* described with reference to FIG. 1, while a first UE 215, a second UE 215-*a*, a third UE 215-*b*, and a fourth UE 215-*c* may be examples of aspects of one or more of the UEs 115, 115-*a* described with reference to FIG. 1.

In the example of a supplemental downlink mode (e.g., licensed assisted access) in the wireless communication system 200, the first base station 205 may transmit orthogonal frequency division multiple access (OFDMA) waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive single carrier frequency division multiple access (SC-FDMA) waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum band and needs to relieve some of the traffic and/or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, and/or resource block interleaved frequency division multiple access (FDMA) waveforms from the second UE 215-*a* using the second bidirectional link 230. The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink mode (e.g., licensed assisted access mode) described above, this scenario may occur with any service provider (e.g., MNO) that uses a licensed radio frequency spectrum band and needs to relieve some of the traffic and/or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, and/or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink (or licensed assisted access), carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 105-a, 205, and/or 205-a described with reference to FIG. 1 and/or FIG. 2, and/or one of the UEs 115, 115-a, 215, 215-a, 215-b, and/or 215-c described with reference to FIG. 1 and/or FIG. 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve and/or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
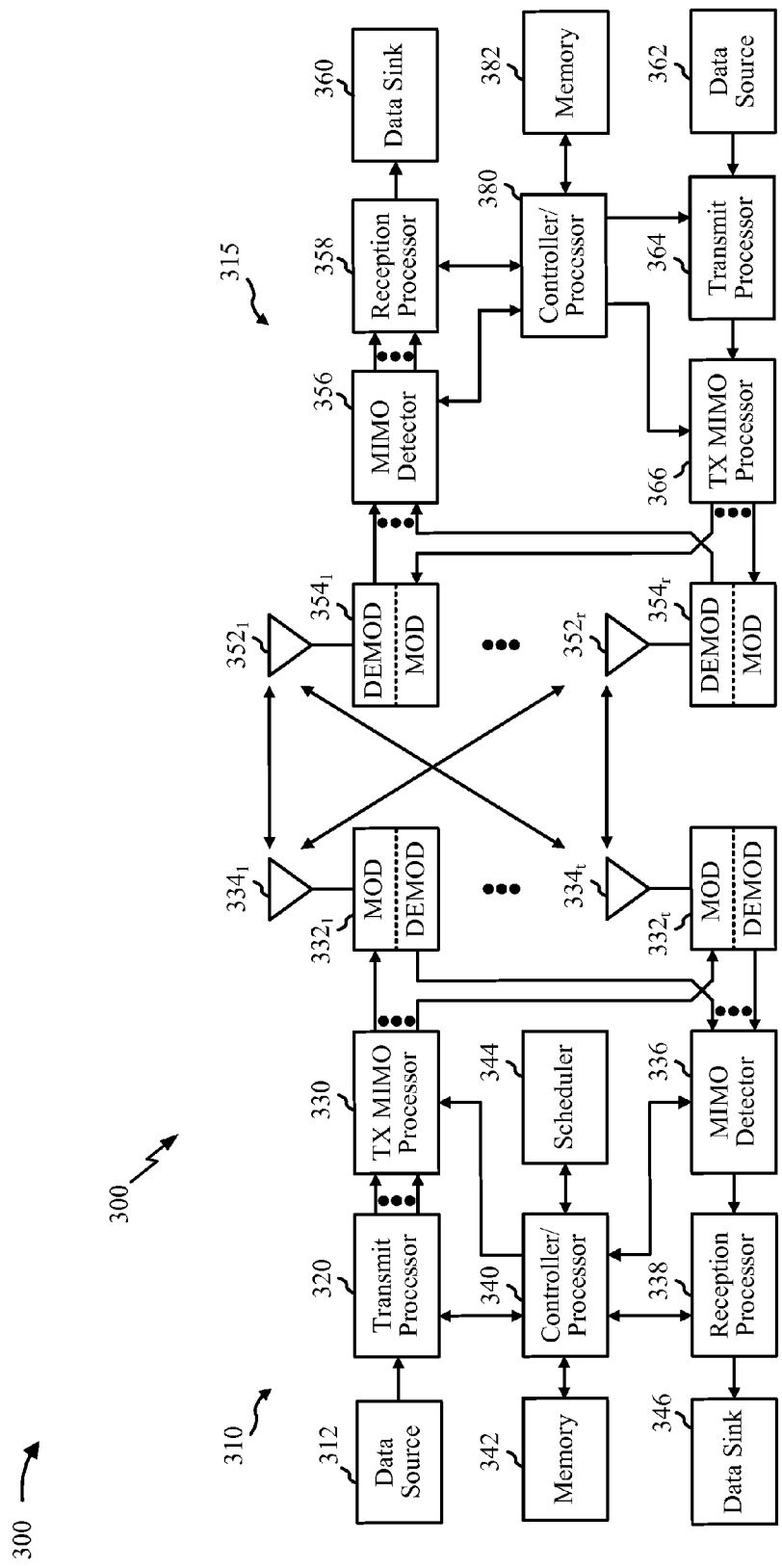
FIG. 3 shows a block diagram illustrating a base station and a UE, in accordance with various aspects of the present disclosure.

FIG. 3 shows a block diagram illustrating a base station 310 and a UE 315, in accordance with various aspects of the present disclosure. For example, base station 310 and UE 315, shown in FIG. 3, may correspond to base station 105 and/or 205 and UE 115 and/or 215, respectively, described with reference to FIG. 1 and/or FIG. 2. Base station 310 may be equipped with antennas $334_1$ through $334_t$, and UE 315 may be equipped with antennas $352_1$ through $352_r$, wherein t and r are integers greater than or equal to one.

At base station 310, a base station transmit processor 320 may receive data from a base station data source 312 and control information from a base station controller/processor 340. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 320 may process (e.g., encode and symbol map) the data and control information to obtain data symbols and control symbols, respectively. Base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to base station modulators/demodulators (MODs/DEMODs) $332_1$ through $332_t$. Each base station modulator/demodulator 332 may process a respective output symbol stream (e.g., for orthogonal frequency-division multiplexing (OFDM), or the like) to obtain an output sample stream. Each base station modulator/demodulator 332 may further process (e.g., convert to analog, amplify, filter, and upconvert) the output sample stream to obtain a downlink signal. Downlink signals from modulators/demodulators $332_1$ through $332_t$ may be transmitted via antennas $334_1$ through $334_t$, respectively.

At UE 315, UE antennas $352_1$ through $352_r$ may receive the downlink signals from base station 310 and may provide received signals to UE modulators/demodulators (MODs/DEMODs) $354_1$ through $354_r$, respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all UE modulators/demodulators $354_1$ through $354_r$, and perform MIMO detection on the received symbols, if applicable, and provide detected symbols. A UE reception processor 358 may process (e.g., demodulate, deinterleave, and decode) the detected symbols, provide decoded data for UE 315 to a UE data sink 360, and provide decoded control information to a UE controller/processor 380.

On the uplink, at UE 315, a UE transmit processor 364 may receive and process data (e.g., for the Physical Uplink Shared Channel (PUSCH)) from a UE data source 362 and control information (e.g., for the Physical Uplink Control Channel (PUCCH)) from UE controller/processor 380. UE transmit processor 364 may also generate reference symbols for a reference signal. The symbols from UE transmit processor 364 may be precoded by a UE TX MIMO processor 366, if applicable, may be further processed by UE modulator/demodulators $354_1$ through $354_r$ (e.g., for SC-FDM, etc.), and may be transmitted to base station 310. At base station 310, the uplink signals from UE 315 may be received by base station antennas 334, processed by base station modulators/demodulators 332, detected by a base station MIMO detector 336, if applicable, and further processed by a base station reception processor 338 to obtain decoded data and control information sent by UE 315. Base station reception processor 338 may provide the decoded data to a base station data sink 346 and the decoded control information to base station controller/processor 340.

Base station controller/processor 340 and UE controller/processor 380 may direct the operation at base station 310 and UE 315, respectively. Base station controller/processor 340 and/or other processors and modules at base station 310 may perform or direct, for example, execution of various processes for the techniques described herein. UE controller/processor 380 and/or other processors and modules at UE 315 may also perform or direct, for example, execution of one or more blocks illustrated in FIG. 3, and/or other processes for the techniques described herein. A base station memory 342 and a UE memory 382 may store data and program codes for base station 310 and UE 315, respectively. A scheduler 344 may schedule UEs 315 for data transmission on the downlink and/or uplink.

In one example, base station 310 may include one or more components for generating a compact Downlink Control Information (DCI) for at least one of uplink (UL) or downlink (DL) transmissions, wherein the compact DCI may comprise a reduced number of bits when compared to certain standard DCI formats; and one or more components for transmitting the DCI. In one aspect, the aforementioned one or more components may be base station controller/processor 340, base station memory 342, base station transmit processor 320, base station modulators/demodulators 332, and/or base station antennas 334 configured to perform the functions recited by the aforementioned one or more components. In another aspect, the aforementioned one or more components may be a module or any apparatus configured to perform the functions recited by the aforementioned one or more components. In one example, UE 315 may include one or more components for receiving compact Downlink Control Information (DCI) for at least one of uplink (UL) or downlink (DL) transmissions, wherein the DCI comprises a reduced number of bits of a standard DCI format; and one or more components for processing the DCI. In one aspect, the aforementioned one or more components may be UE controller/processor 380, UE memory 382, UE reception processor 358, UE MIMO detector 356, UE modulators/demodulators 354, and/or UE antennas 352 configured to perform the functions recited by the aforementioned one or more components. In another aspect, the aforementioned one or more components may be a module or any apparatus configured to perform the functions recited by the aforementioned one or more components.

Figure 4A:
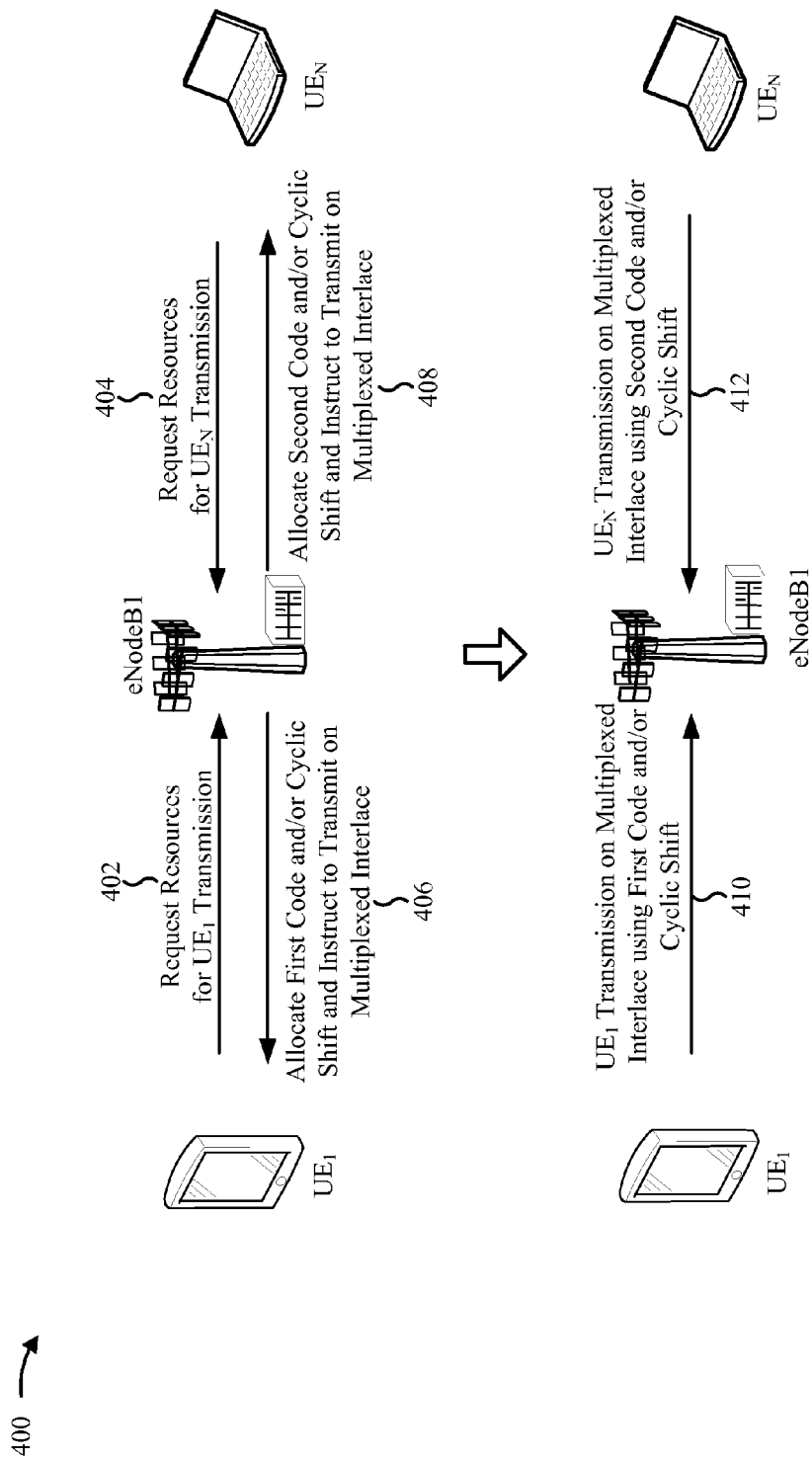
FIG. 4A shows a diagram illustrating an example of allocating codes and/or cyclic shifts to one or more UEs for transmissions (e.g., of bits of data) on an interlace of resources, in accordance with various aspects of the present disclosure.

FIG. 4A shows a diagram 400 illustrating an example of allocating codes and/or cyclic shifts to one or more UEs for transmissions (e.g., of bits of data) on an interlace of resources, in accordance with various aspects of present disclosure. For the purposes of FIG. 4A, a plurality of UEs (e.g., $UE_1$ through $UE_N$, each of which may correspond to UE 115 of FIG. 1) may be configured to transmit payloads to a base station (e.g., eNodeB1, which may correspond to base station 105 of FIG. 1) using an unlicensed radio frequency spectrum band.

As shown in FIG. 4A, and by reference number 402, $UE_1$ may provide, to eNodeB1, a request for uplink resources (e.g., one or more RBs) to be allocated to $UE_1$ for a transmission by $UE_1$ (e.g., a transmission having a small amount of data). Similarly, as shown by reference number 404, $UE_N$ may provide, to eNodeB1 a request for uplink resources (e.g., one or more RBs) to be allocated to $UE_N$ for a transmission by $UE_N$ (e.g., a transmission having a small amount of data).

For the purposes of FIG. 4A, an uplink structure for a subframe (e.g., a 1 ms subframe), associated with uplink transmissions in the unlicensed radio frequency spectrum band, may include a plurality of uplink resources distributed among a plurality of interlaces of resources. Further, eNodeB1 may be configured to allocate an interlace of resources for multiplexing transmissions of the plurality of UEs (herein referred to as a multiplexed interlace of resources).

As shown by reference number 406, eNodeB1 may determine (e.g., based on a size of the $UE_1$ transmission that has a small amount of data), that $UE_1$ is to transmit the $UE_1$ transmission on uplink resources of the multiplexed interlace of resources using a first code and/or a first cyclic shift, and may provide, to $UE_1$, information instructing $UE_1$ to transmit the $UE_1$ transmission on the uplink resources of the multiplexed interlace of resources using the first code and/or the first cyclic shift. Similarly, as shown by reference number 408, eNodeB1 may determine (e.g., based on a size of the $UE_N$ transmission that has a small amount of data), that $UE_N$ is to transmit the $UE_N$ transmission on the uplink resources of the multiplexed interlace of resources using a second code and/or a second cyclic shift, and may provide, to $UE_N$, information instructing $UE_N$ to transmit the $UE_N$ transmission on the uplink resources of the multiplexed interlace of resources using the second code and/or the second cyclic shift.

As shown by reference number 410, $UE_1$ may apply the first code and/or the first cyclic shift to the $UE_1$ transmission, and may transmit the $UE_1$ transmission on the uplink resources of the multiplexed interlace of resources. Similarly, as shown by reference number 412, $UE_N$ may apply the second code and/or the second cyclic shift to the $UE_N$ transmission, and may transmit the $UE_N$ transmission on the uplink resources of the multiplexed interlace of resources. In other words, $UE_1$ and $UE_N$ may each transmit their respective transmissions on the uplink resources of the multiplexed interlace of resources (e.g., during the same subframe) using the allocated codes and/or cyclic shifts. In this way, the interlace of resources may be multiplexed for transmissions of small amounts of information by a plurality of UEs (e.g., in order to efficiently use the uplink resources, in order to reduce power consumption by the plurality of UEs, etc.).

Figure 4B:
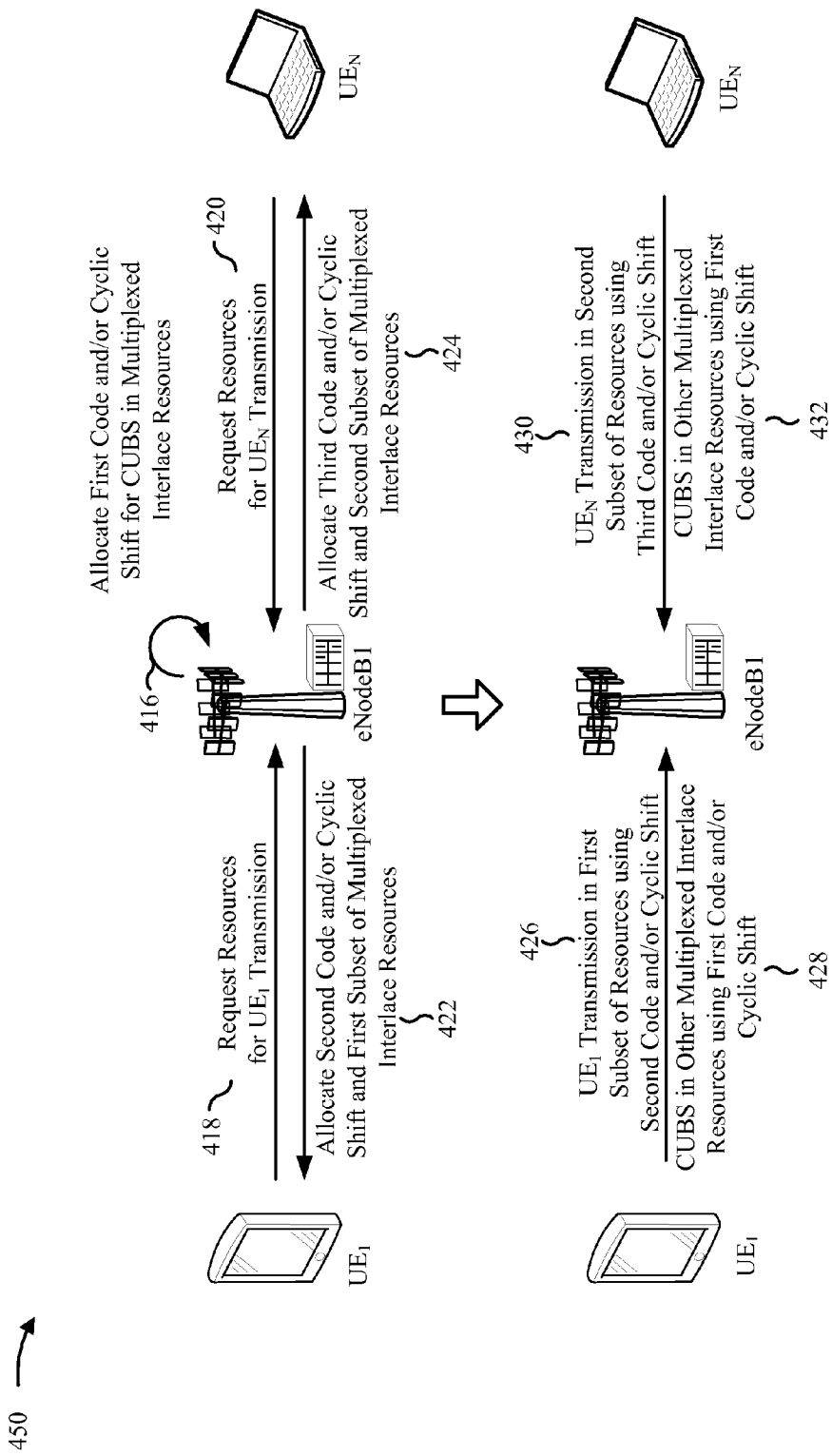
FIG. 4B shows a diagram illustrating an example of allocating a first code and/or a first cyclic shift for a first transmission using an interlace of resources, and allocating a second code and/or a second cyclic shift to a UE for a second transmission using the interlace of resources, in accordance with various aspects of the present disclosure.

FIG. 4B shows a diagram 450 illustrating an example of allocating a first code and/or a first cyclic shift for a first transmission using an interlace of resources, and allocating a second code and/or a second cyclic shift to a UE for a second transmission using the interlace of resources, in accordance with various aspects of the present disclosure. For the purposes of FIG. 4B, a plurality of UEs (e.g., $UE_1$ through $UE_N$, which may correspond to UE 115 of FIG. 1) may be configured to transmit information to a base station (e.g., eNodeB1, which may correspond to base station 105 of FIG. 1) using uplink resources of an unlicensed radio frequency spectrum band.

As shown in FIG. 4B, and by reference number 416, eNodeB1 may allocate a first code and/or a first cyclic shift to transmissions of channel occupancy information (e.g., a channel usage beacon signal "CUBS" in FIG. 4B) in uplink resources of an interlace of resources for multiplexing transmissions of the plurality of UEs (herein referred to as a multiplexed interlace of resources). In some aspects, channel occupancy information may include information that may be ignored, discarded, deleted, or the like. As shown by reference number 418, $UE_1$ may provide, to eNodeB1, a request for uplink resources to be allocated to $UE_1$ for a transmission by $UE_1$ (e.g., a $UE_1$ transmission). Similarly, as shown by reference number 420, $UE_N$ may provide, to eNodeB1, a request for uplink resources to be allocated to $UE_N$ for a transmission by $UE_N$ (e.g., a $UE_N$ transmission).

For the purposes of FIG. 4B, an uplink structure for a subframe (e.g., a 1 ms subframe), associated with uplink transmissions in the unlicensed radio frequency spectrum band, may include a plurality of uplink resources distributed among a plurality of interlaces of resources. As shown by reference number 422, eNodeB1 may determine that $UE_1$ is to transmit the $UE_1$ transmission on a first subset of uplink resources of the multiplexed interlace of resources using a second code and/or a second cyclic shift, that $UE_1$ is to transmit a CUBS on other uplink resources of the multiplexed interlace of resources using the first code and/or the first cyclic shift, and may provide allocation information to $UE_1$, accordingly. Similarly, as shown by reference number 424, eNodeB1 may determine that $UE_N$ is to transmit the $UE_N$ transmission on a second subset of uplink resources of the multiplexed interlace of resources using a third code and/or a third cyclic shift, that $UE_N$ is to transmit a CUBS on other uplink resources of the multiplexed interlace of resources using the first code and/or the first cyclic shift, and may provide allocation information to $UE_N$, accordingly.

As shown by reference number 426, $UE_1$ may apply the second code and/or the second cyclic shift to the $UE_1$ transmission, and may transmit the $UE_1$ transmission in the first subset of uplink resources of the multiplexed interlace of resources. As shown by reference number 428, $UE_1$ may also transmit a CUBS in other uplink resources of the multiplexed interlace of resources using the first code and/or the first cyclic shift. Similarly, as shown by reference number 430, $UE_N$ may apply the third code and/or the third cyclic shift to the $UE_N$ transmission, and may transmit the $UE_N$ transmission in the second subset of uplink resources of the multiplexed interlace of resources. As shown by reference number 432, UEN may also transmit a CUBS in other uplink resources of the multiplexed interlace of resources using the first code and/or the first cyclic shift.

In other words, $UE_1$ may transmit the $UE_1$ transmission in the first subset of resources using the second code and/or the second cyclic shift, and $UE_N$ may transmit a CUBS in the first subset of resources using the first code and/or the first cyclic shift. Similarly, $UE_1$ may transmit a CUBS in the second subset of resources using the first code and/or the first cyclic shift, and $UE_N$ may transmit the $UE_N$ transmission in the second subset of resources using the third code and/or the third cyclic shift. In this way, multiplexing may be applied to the uplink resources of an interlace of resources for transmission of information by a plurality of UEs (e.g., in order to efficiently use the uplink resources).

FIG. 4C shows a diagram 490 illustrating an example of allocating a first interlace of resources for a first transmission associated with occupying an unlicensed radio frequency spectrum band, and allocating a second interlace of resources for a second transmission by one or more base stations, in accordance with various aspects of the present disclosure. For the purposes of FIG. 4C, a first plurality of UEs (e.g., $UE_{1.1}$ through $UE_{1.X}$) may be communicating via a first base station (e.g., eNodeB1) located in a geographic area, a second plurality of UEs (e.g., $UE_{2.1}$ through $UE_{2.Y}$) may be communicating via a second base station (e.g., eNodeB2) located in the geographic area, and a third plurality of UEs (e.g., $UE_{3.1}$ through $UE_{3.Z}$) may be communicating via a third base station (e.g., eNodeB3) located in the geographic area. Further, the base stations may be configured to transmit information to respective UEs using downlink resources of an unlicensed radio frequency spectrum band. In some aspects, UEs of FIG. 4C may correspond to UE 115, and eNodeBs of FIG. 4C may correspond to base station 105 described with reference to FIG. 1.

As shown by reference number 434, the plurality of base stations may communicate in order to coordinate allocation of an interlace of resources for transmissions associated with occupying the unlicensed radio frequency spectrum band (herein referred to as the occupation interlace of resources). As shown by reference numbers 438, 440, and 442, based on allocating the occupation interlace of resources among the plurality of base stations, each of the base stations may transmit channel occupancy information (e.g., a CUBS) on downlink resources of the occupation interlace of resources. In some aspects, the base stations may transmit a CUBS on downlink resources of the occupation interlace of resources in order to satisfy a bandwidth requirement associated with the channel and/or in order to occupy the unlicensed radio frequency spectrum band. Additionally, the base stations may concurrently occupy the unlicensed radio frequency spectrum band when the base stations transmit a CUBS on the downlink resources of the occupation interlace of resources.

As shown by reference number 436, the base stations may then communicate in order to coordinate allocation of other interlaces of resources for other transmissions by the base stations (e.g., transmissions to the UEs). For example, the plurality of base stations may communicate such that a first set of interlaces of resources is allocated for transmissions by eNodeB1, a second set of interlaces of resources is allocated for transmissions by eNodeB2, and a third set of interlaces of resources are allocated for transmissions by eNodeB3. In some aspects, a single interlace of resources may be allocated to a single base station. Additionally or alternatively, a single interlace of resources may be allocated to two or more base stations. Additionally or alternatively, an interlace of resources may not be allocated to any base station. Additionally or alternatively, a plurality of interlaces of resources may be allocated to a single base station.

In this way, downlink resources of an unlicensed radio frequency spectrum band may be efficiently used by a plurality of base stations (e.g., concurrently occupying the unlicensed radio frequency spectrum band) by causing the plurality of base stations to transmit channel occupancy information in an interlace of resources of the unlicensed radio frequency spectrum band, and allocating other interlaces of resources among the plurality of base stations.

Figure 5A:
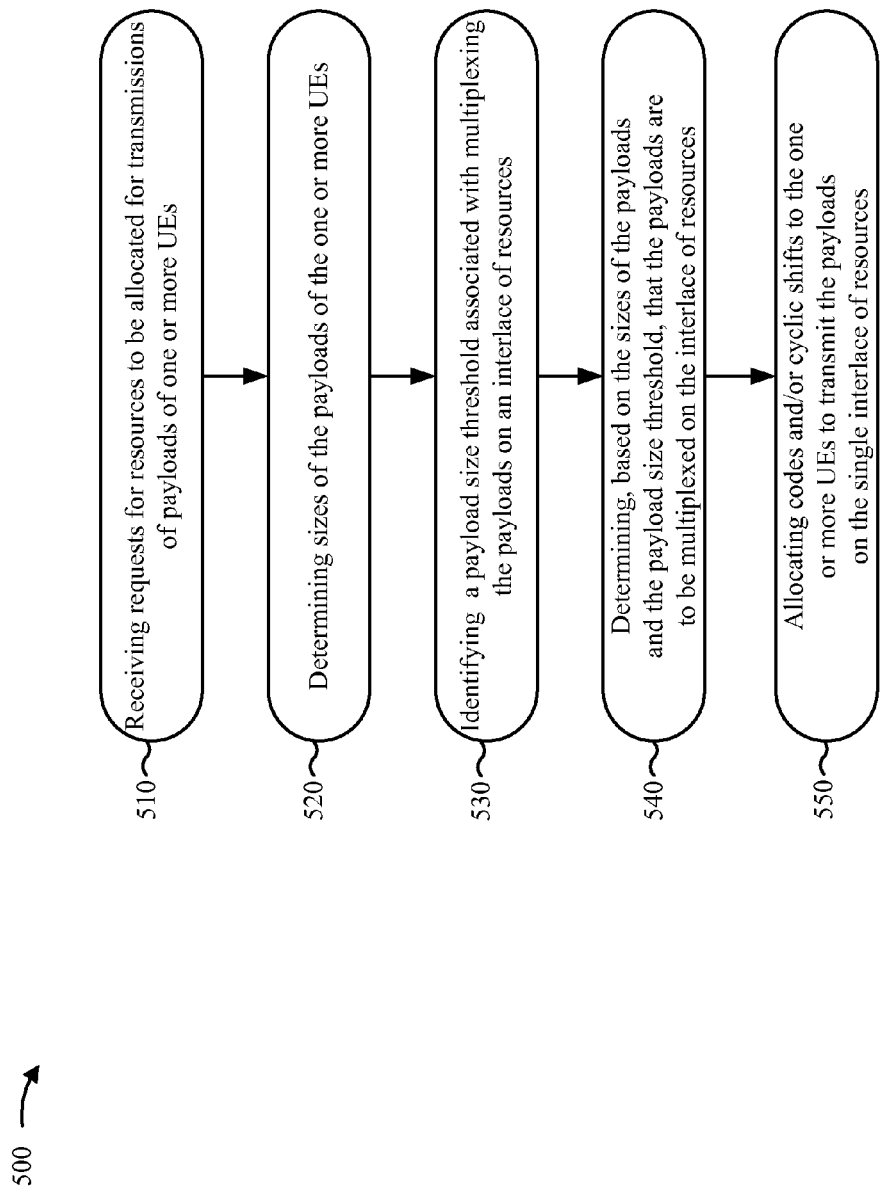
FIG. 5A shows a flow chart illustrating an example of a method for allocating codes and/or cyclic shifts to one or more UEs for transmissions on an interlace of resources, in accordance with various aspects of the present disclosure.

FIG. 5A shows a flow chart illustrating an example of a method 500 for allocating codes and/or cyclic shifts to one or more UEs for transmissions on an interlace of resources, in accordance with various aspects of the present disclosure. In some aspects, one or more blocks of FIG. 5A may be performed by base station 105 and/or base station 205 described with reference to FIG. 1 and/or FIG. 2. In some aspects, one or more blocks of FIG. 5A may be performed by another device or a plurality of devices separate from or including base station 105, such as UE 115 described with reference to FIG. 1.

As shown in FIG. 5A, the method 500 may include receiving requests for resources to be allocated for transmissions of payloads of one or more UEs (block 510). For example, base station 105 may receive requests for resources to be allocated for transmission of payloads of one or more UEs 115. In some aspects, base station 105 may receive the requests after the one or more UEs 115 provide the requests.

In some aspects, base station 105 may receive the request from the one or more UEs 115. For example, each UE 115, of the one or more UEs 115, may send, to base station 105, a buffer status report (BSR) for a request of resources for a transmission of a payload by UE 115. In some aspects, the BSR may include information indicating a size of the payload to be transmitted by UE 115. In some aspects, base station 105 may receive one or more requests corresponding to the one or more UEs 115.

As shown in FIG. 5A, the method 500 may include determining sizes of the payloads of the one or more UEs (block 520). For example, base station 105 may determine sizes of the payloads of one or more UEs 115. In some aspects, base station 105 may determine the sizes of the payloads when base station 105 receives the requests for resources to be allocated for transmission of the payloads of the one or more UEs 115.

In some aspects, base station 105 may determine the sizes of the payloads based on information provided by UEs 115. For example, as described above, UE 115 may provide a BSR associated with transmitting a payload (e.g., a payload including PUSCH information, such as an RRC signaling message, uplink control information (UCI), application data, etc.) to base station 105. In this example, the BSR may include information that identifies a size of the payload, such as information that indicates a quantity of bits needed to transmit the payload. In some aspects, base station 105 may determine sizes of a plurality of payloads in order to determine whether the payloads are to be multiplexed in a single interlace of uplink resources, as described below.

As further shown in FIG. 5A, the method 500 may include identifying a payload size threshold associated with multiplexing the payloads on an interlace of resources (block 530). For example, base station 105 may identify a payload size threshold associated with multiplexing the payloads on an interlace of resources.

Figure 5B:
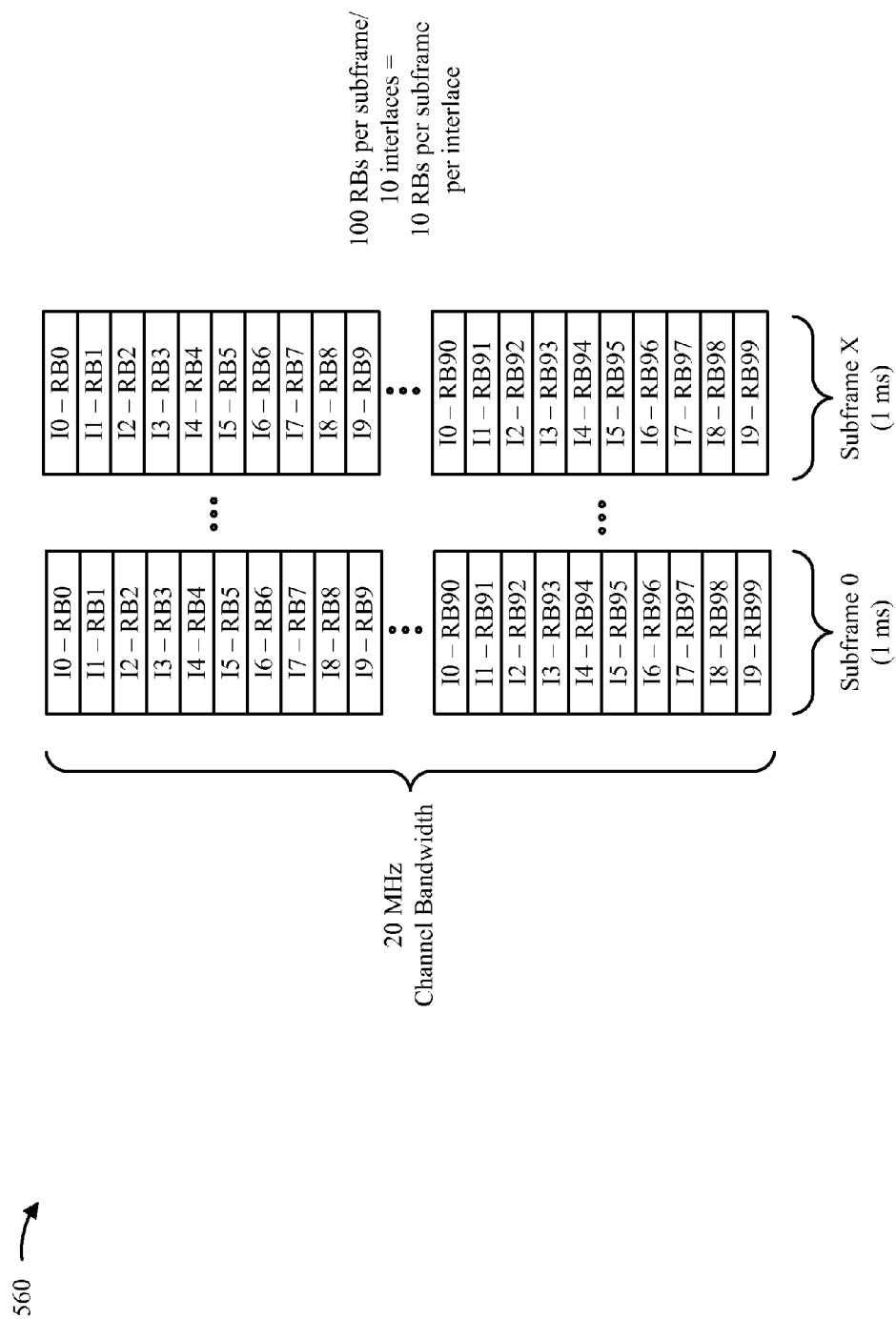
FIG. 5B shows a diagram illustrating an example of an uplink structure that may include a plurality interlaces of resources used for transmission in an unlicensed radio frequency spectrum band, in accordance with various aspects of the present disclosure.

An interlace of resources may include a plurality of resources (e.g., resource blocks) that are distributed across an unlicensed radio frequency spectrum band. FIG. 5B shows a diagram illustrating an example of an uplink structure 560 that may include a plurality of interlaces of resources used for transmission in an unlicensed radio frequency spectrum band, in accordance with various aspects of the present disclosure. As shown in FIG. 5B, a bandwidth of the unlicensed radio frequency spectrum band may be 20 MHz. Here, the 20 MHz band may be divided into 100 resources (e.g., resource blocks RB0 through RB99) per subframe (e.g., per 1 ms subframe). As shown, in this example, the uplink structure may include ten interlaces of resources (e.g., I0 through I9), and each interlace of resources may include ten uplink resources that are distributed across the 20 MHz bandwidth (e.g., I0 may include RB0, RB10, RB90, etc., I9 may include RB9, RB19, RB99, etc.). FIG. 5B shows an example of an uplink structure associated with aspects described herein. In some aspects, another and/or a different uplink structure may be applied to aspects described herein (e.g., an uplink structure with fewer than ten interlaces of resources, an uplink structure with greater than ten interlaces of resources, an uplink structure with fewer than 100 resources, an uplink structure with greater than 100 resources, an uplink structure for a different bandwidth, etc.).

Returning to FIG. 5A, a payload size threshold may include information that identifies a maximum payload size (e.g., a quantity of bits) associated with multiplexing payloads on the single interlace of resources. In some aspects, base station 105 may identify the payload size threshold based on information stored or accessible by base station 105. In some aspects, base station 105 may determine whether the payloads are to be multiplexed on the interlace or resources based on comparing the payload size threshold and the sizes of the payloads, as described below.

In some aspects, base station 105 may identify the interlace of resources on which the payloads may be multiplexed. For example, base station 105 may store or have access to information indicating that an interlace of resources is to be used for multiplexing payloads, and may identify the interlace of resources based on the stored or accessed information. As another example, base station 105 may determine that an interlace of resources has not been allocated for another transmission (e.g., during the subframe), and may identify the interlace of resources as the interlace of resources.

In some aspects, base station 105 may determine a format structure to be used for transmitting the payloads on the single interlace of resources. For example, the transmissions of the payloads may be formatted using PUCCH format 2. In some aspects, the use of PUCCH format 2 for transmitting the payloads may allow approximately 100 bits of payload to be transmitted on the interlace of resources by each of six UEs 115 using a plurality of codes for multiplexing (i.e., code division multiplexing) the payloads. As another example, the transmissions of the payloads may be formatted using PUCCH format 3. In some aspects, the use of PUCCH format 3 for transmitting the payloads may allow approximately 210 bits of payload to be transmitted on the single interlace of resources by each of four UEs 115 (or each of five UEs 115 when a sounding reference signal (SRS) is not used) using a plurality of cyclic shifts for multiplexing the payloads.

As further shown in FIG. 5A, the method 500 may include determining, based on the sizes of the payloads and the payload size threshold, that the payloads are to be multiplexed on the interlace of resources (block 540). For example, base station 105 may determine, based on the sizes of the payloads and the payload size threshold, that the payloads are to be multiplexed on the interlace of resources. In some aspects, base station 105 may determine that the payloads are to be multiplexed on the interlace of resources after base station 105 determines the sizes of the payloads. Additionally or alternatively, base station 105 may determine that the payloads are to be multiplexed on the interlace of resources after base station 105 identifies the payload size threshold.

In some aspects, base station 105 may determine that the payloads are to be multiplexed on the interlace of resources based on the payload size threshold. For example, base station 105 may store or have access to information that identifies the payload size threshold that identifies a maximum payload size that may be multiplexed with other payloads. Further, base station 105 may determine a first size of a first payload to be transmitted by a first UE 115, a second size of a second payload to be transmitted by a second UE 115, a third size of a third payload to be transmitted by a third UE 115, and so on. Here, base station 105 may compare the first size and the payload size threshold and may determine that the payload size threshold is not satisfied (e.g., that the size of the first payload is less than or equal to the maximum payload size for multiplexing payloads on the interlace of resources). Similarly, base station 105 may compare the second size and the payload size threshold and may determine that the payload size threshold is not satisfied by the second payload size. However, base station 105 may compare the third size and the payload size threshold and may determine that the payload size threshold is satisfied (e.g., that the size of the third payload is greater than the maximum payload size for multiplexing payloads on the interlace of resources). Here, base station 105 may determine that the first payload and the second payload (e.g., and other payloads with sizes that do not satisfy the payload size threshold) are to be multiplexed on the interlace of resources. Additionally, base station 105 may determine that the third payload is not to be multiplexed on the interlace of resources. In some aspects, base station 105 may allocate another interlace of resources to a payload that is not to be multiplexed on the interlace of resources (e.g., such that the payload is the only payload transmitted on the other interlace of resources).

In some aspects, base station 105 may determine that the payloads are to be multiplexed on a plurality of interlaces of resources. For example, base station 105 may determine that each size, of a plurality of sizes of payloads, does not satisfy the payload threshold, and that the total size of the payloads is greater than a maximum total payload size (e.g., a maximum total payload size that may be multiplexed on the interlace of resources). In this example, base station 105 may identify two more interlaces of resources on which the payloads are to be multiplexed. As another example, base station 105 may determine payload sizes for a plurality of UEs 115 that includes a quantity of UEs that exceeds a maximum quantity of UEs 115 for which payloads may be multiplexed (e.g., when base station 105 determines sizes of payloads for seven UEs 115 and only six codes and/or cyclic shifts are available for multiplexing the payloads). In this example, base station 105 may identify two more interlaces of resources on which the payloads are to be multiplexed.

As further shown in FIG. 5A, the method 500 may include allocating codes and/or cyclic shifts to the one or more UEs to transmit the payloads on the interlace of resources (block 550). For example, base station 105 may allocate codes and/or cyclic shifts to the one or more UEs 115 to transmit the payloads on the interlace of resources. In some aspects, base station 105 may allocate the codes and/or the cyclic shifts to the one or more UEs 115 after base station 105 determines that the payloads are to be multiplexed on the interlace of resources.

In some aspects, base station 105 may allocate a different code and/or a different cyclic shift to each UE 115 for transmission of the payloads. For example, base station 105 may determine that a first payload for a first UE 115, a second payload for a second UE 115, and a third payload for a third UE 115 are to be multiplexed on the interlace of resources. In this example, base station 105 may allocate a first code and/or a first cyclic shift to the first UE 115, a second code and/or a second cyclic shift to the second UE 115, and a third code and/or a third cyclic shift to the third UE 115. In this way, each UE 115 may be allocated a different code and/or a different cyclic shift for multiplexing the payloads on the interlace of resources.

In some aspects, base station 105 may allocate codes to UEs 115 for transmission of the payloads. For example, base station 105 may allocate a plurality of codes, such as a plurality of Walsh codes, to UEs 115 (e.g., for code division multiplexing) when the resources of the single interlace of resources are to be formatted using PUCCH format 3. Additionally or alternatively, base station 105 may allocate cyclic shifts to UEs 115 for transmission of the payloads. For example, base station 105 may allocate a plurality of cyclic shifts to UEs 115 when the resources of the single interlace of resources are to be formatted using PUCCH format 2.

In some aspects, base station 105 may allocate a plurality of codes and/or a plurality of cyclic shifts to a single UE 115. For example, base station 105 may determine, based on a first size of a first payload to be transmitted by a first UE 115, that base station 105 is to allocate two codes to the first UE 115, and base station 105 may allocate a first code and a second code to the first UE 115 (e.g., while base station 105 may allocate only one code to a second UE 115 for a transmission of a second payload of a second size).

In some aspects, base station 105 may provide, to UEs 115, information associated with the allocated codes and/or the allocated cyclic shifts. For example, base station 105 may provide, to a UE 115, downlink control information for an uplink grant that includes information that identifies the interlace of resources, information that identifies the format (e.g., PUCCH format 2, PUCCH format 3, etc.) to be used to transmit the payloads in the uplink resources, information that identifies the codes and/or the cyclic shifts allocated to UE 115, and/or another type of information. In some aspects, base station 105 may provide the information that identifies the interlace of resources, the information that identifies the format to be used to transmit the payloads in the resources, and/or the information that identifies the codes and/or the cyclic shifts allocated to UE 115 using an RRC message. In this way, base station 105 may allocate one or more codes and/or cyclic shifts to each UE 115 for multiplexing of payloads on an interlace of resources.

In some aspects, due to the size of the payloads being transmitted by UEs 115, a reduced quantity of cyclic redundancy check (CRC) bits may be attached to the payloads. For example, in some aspects, UE 115 may attach a quantity of CRC bits that is less than twenty-four bits. In some aspects, a transport block size (TBS), associated with transmitting the payloads, may be determined based on a modulation and coding scheme (MCS) and a total quantity of the codes and/or the total quantity of cyclic shifts allocated to UEs 115. For example, with PUCCH format 3, a TBS for transmitting the payloads may be determined based on a MCS, a quantity of resources in the interlace of resources, the total quantity of codes and/or cyclic shifts, and/or a quantity of UEs 115.

Although FIG. 5A shows example blocks of the method 500, in some aspects, the method 500 may include additional blocks, fewer blocks, different blocks, or differently arranged blocks than those illustrated in FIG. 5A. Additionally or alternatively, two or more of the blocks of the method 500 may be performed in parallel.

Figure 6A:
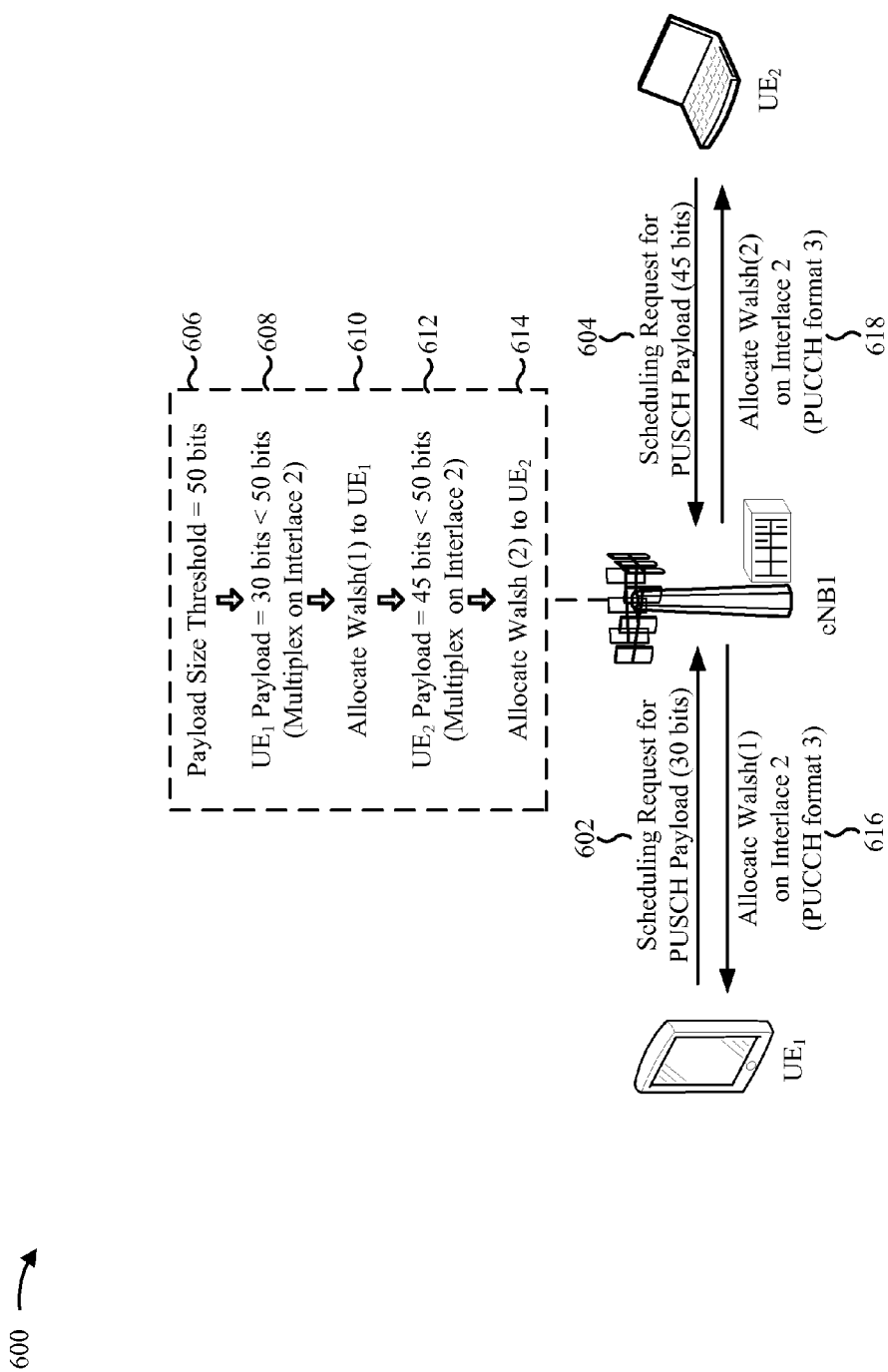
FIGS. 6A and 6B shows a diagram illustrating an example relating to the example of the method shown in FIG. 5A, in accordance with various aspects of the present disclosure.
Figure 6B:
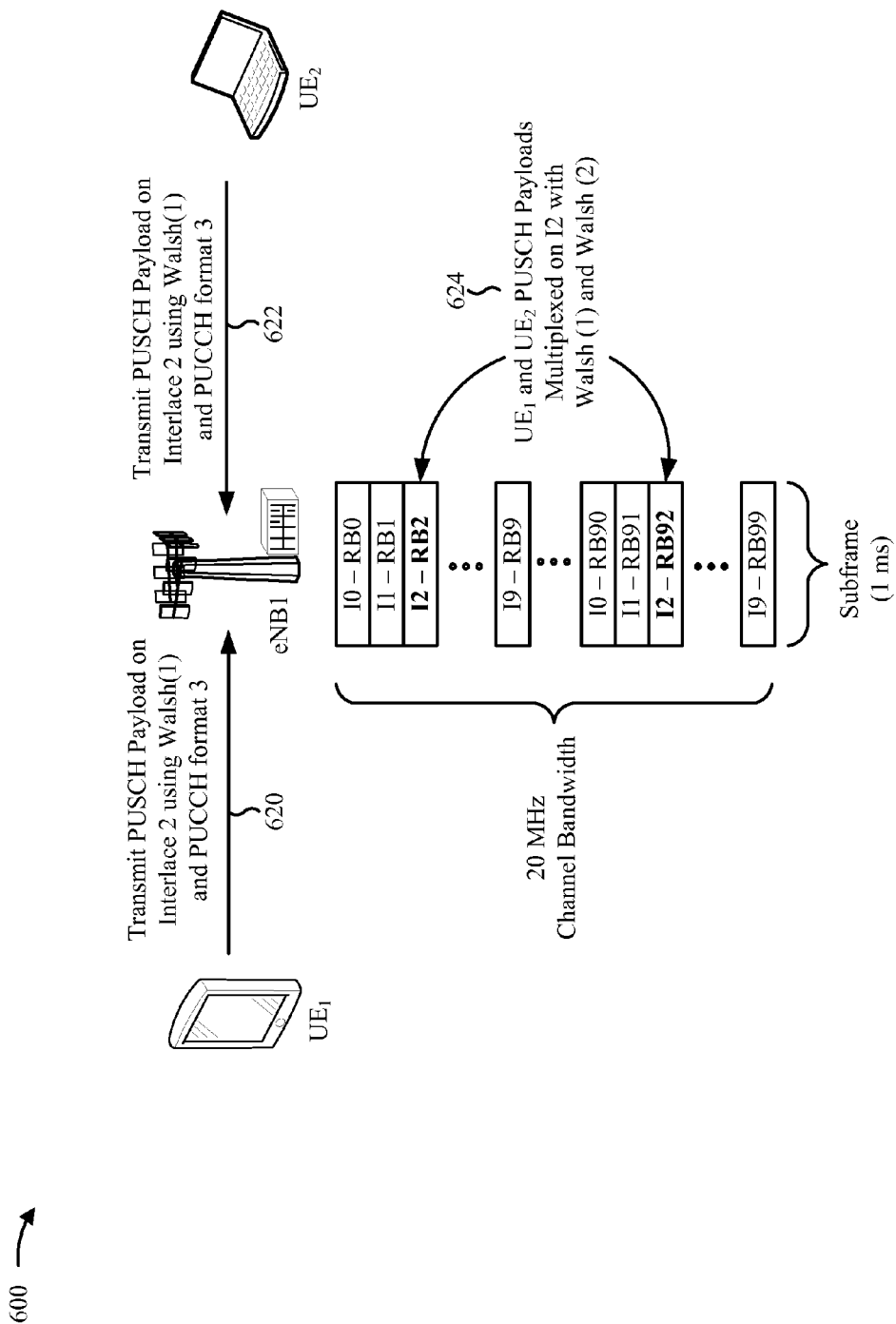

FIGS. 6A and 6B show a diagram 600 illustrating an example relating to the example of the method shown in FIG. 5A, in accordance with various aspects of the present disclosure. FIGS. 6A and 6B show an example of allocating codes and/or cyclic shifts to one or more UEs to transmit payloads on a single interlace of resources. For the purposes of example 600, a plurality of UEs 115 (e.g., $UE_1$ and $UE_2$) may be configured to transmit payloads (e.g., PUSCH payloads) to base station 105 (e.g., eNB1) using uplink resources of an unlicensed radio frequency spectrum band.

As shown in FIG. 6A, and by reference number 602, UE$_1$ may provide, to eNB1, a scheduling request for uplink resources to be allocated to UE$_1$ for a transmission of a UE$_1$ PUSCH payload. As shown, the UE$_1$ scheduling request may include information indicating that a size of the UE$_1$ PUSCH payload is 30 bits. Similarly, as shown by reference number 604, UE$_2$ may provide, to eNB1 a scheduling request for uplink resources to be allocated to UE$_2$ for a transmission of a UE$_2$ PUSCH payload. As shown, the UE$_2$ scheduling request may include information indicating that a size of the UE$_2$ payload is 45 bits.

For the purposes of example 600, an uplink structure for a subframe (e.g., a 1 ms subframe), associated with uplink transmissions in the unlicensed radio frequency spectrum band (e.g., with a bandwidth of 20 MHz), may include a plurality of uplink resources distributed among a plurality of interlaces of resources (e.g., I0 through I9).

As shown by reference number 606, eNB1 may determine a payload size threshold (e.g., 50 bits) associated with multiplexing payloads on a single interlace of resources of the unlicensed radio frequency spectrum band. As shown by reference number 608, eNB1 may compare the size of the UE$_1$ PUSCH payload and the payload size threshold, and may determine (e.g., since 30 bits is less than or equal to 50 bits) that the UE$_1$ PUSCH payload is to be multiplexed on an interlace of resources identified as I2 (e.g., eNB1 may store or have access to information indicating that I2 is to be used for multiplexing of PUSCH payloads). As shown by reference number 610, based on determining that the UE$_1$ PUSCH payload is to be multiplexed on I2, eNB1 may allocate a first code (e.g., Walsh(1)) to UE$_1$ for transmission of the UE$_1$ PUSCH payload (e.g., eNB1 may determine that PUCCH format 3 is to be used for multiplexing on I2).

As shown by reference number 612, eNB1 may compare the size of the UE$_2$ PUSCH payload and the payload size threshold, and may determine (e.g., since 45 bits is less than or equal to 50 bits) that the UE$_2$ PUSCH payload is to be multiplexed on I2. As shown by reference number 614, based on determining that the UE$_2$ PUSCH payload is to be multiplexed on I2, eNB1 may allocate a second code (e.g., Walsh(2)) to UE$_2$ for transmission of the UE$_2$ PUSCH payload.

As shown by reference number 616, eNB1 may provide, to UE$_1$, information indicating UE$_1$ is to transmit the UE$_1$ PUSCH payload on I2 in PUCCH format 3 using Walsh (1). As shown by reference number 618, eNB1 may provide, to UE$_2$, information indicating UE$_2$ is to transmit the UE$_2$ PUSCH payload on I2 in PUCCH format 3 using Walsh (2).

As shown in the upper portion of FIG. 6B, and by reference number 620, UE$_1$ may apply Walsh (1) to the UE$_1$ PUSCH payload, and may transmit the coded UE$_1$ PUSCH payload on the uplink resources of I2 in PUCCH format 3. Similarly, as shown by reference number 622, UE$_2$ may apply Walsh (2) to the UE$_2$ PUSCH payload, and may transmit the coded UE$_2$ PUSCH payload on the uplink resources of I2 in PUCCH format 3.

In this way, as shown by the lower portion of FIG. 6B and by reference number 624, UE$_1$ and UE$_2$ may each transmit respective coded PUSCH payloads on the uplink resources of I2 (e.g., in resource block 2, resource block 12, resource block 92, etc.). In this way, multiplexing may be applied to the uplink resources of the interlace of resources for transmission of small payloads by a plurality of UEs.

As indicated above, FIGS. 6A and 6B are provided merely as an example. Other examples are possible and may differ from what was described with regard to FIGS. 6A and 6B.

Figure 7:
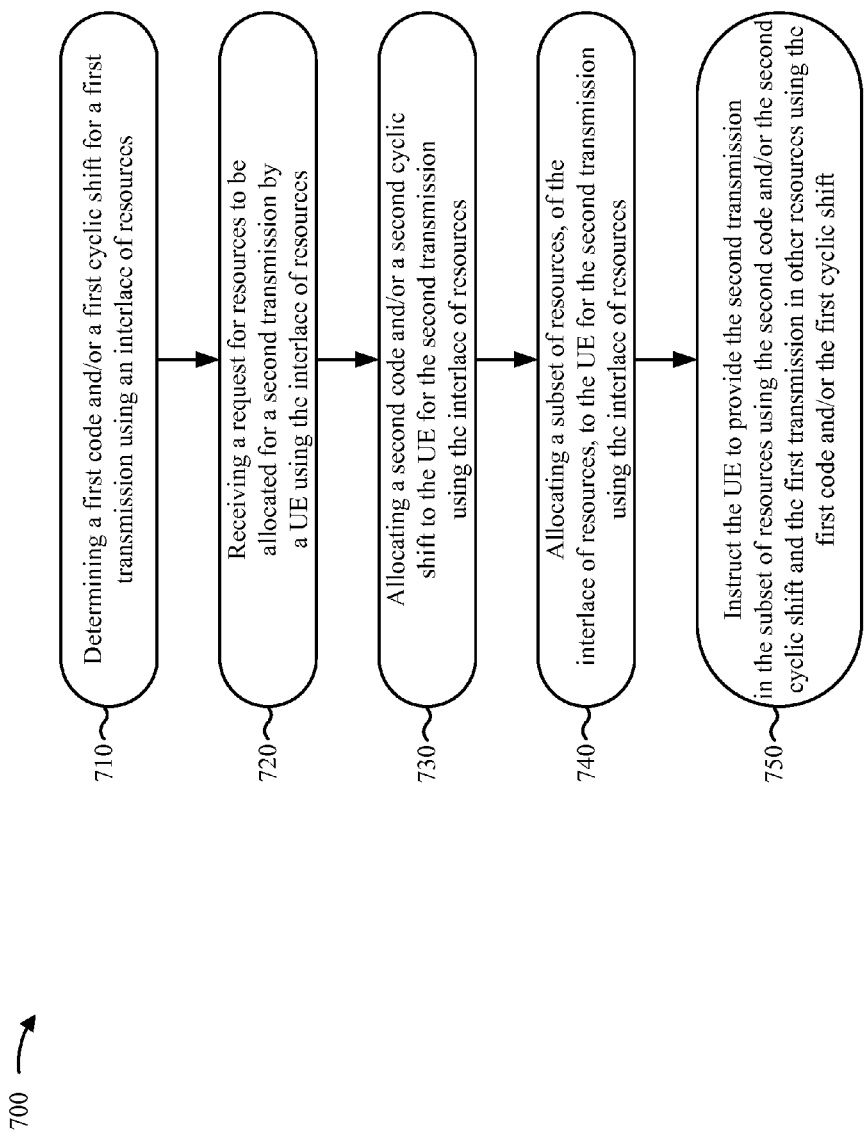
FIG. 7 shows a flow chart illustrating an example of a method for allocating different codes and/or different cyclic shifts to a plurality of UE for transmissions using an interlace of resources, in accordance with various aspects of the present disclosure.

FIG. 7 shows a flow chart illustrating an example of a method 700 for allocating different codes and/or different cyclic shifts to a plurality of UEs for transmissions using an interlace of resources, in accordance with various aspects of the present disclosure. In some aspects, one or more blocks of FIG. 7 may be performed by base station 105 described with reference to FIG. 1. In some aspects, one or more blocks of FIG. 7 may be performed by another device or a plurality of devices separate from or including base station 105, such as UE 115 described with reference to FIG. 1.

As shown in FIG. 7, the method 700 may include determining a first code and/or a first cyclic shift for a first transmission using an interlace of resources (block 710). For example, base station 105 may determine a first code and/or a first cyclic shift for a first transmission using an interlace of resources. In some aspects, base station 105 may determine the first code and/or the first cyclic shift for the first transmission when base station 105 receives an indication to determine the first code and/or the first cyclic shift for the first transmission.

In some aspects, the first transmission may be a channel occupancy transmission. A channel occupancy transmission may include a transmission that includes information that may be ignored, discarded, deleted, or the like, by an apparatus that receives the information (herein referred to as channel occupancy information). In some aspects, UEs 115 may transmit channel occupancy information using the interlace of resources in order to satisfy a bandwidth requirement associated with occupying an unlicensed radio frequency spectrum band that includes the interlace of resources.

In some aspects, base station 105 may allocate the first code and/or the first cyclic shift for the first transmission (e.g., the channel occupancy transmission) based on information stored or accessible by base station 105. For example, base station 105 may store or access information that identifies a plurality of cyclic shifts (e.g., cyclic shift 0 through cyclic shift 6) that may be available for multiplexing transmissions of control information (e.g., PUCCH information using PUCCH format 2) by UEs 115. Here, base station 105 may allocate a cyclic shift (e.g., cyclic shift 0), of the plurality of cyclic shifts, for channel occupancy transmissions by UEs 115. In this example, the other cyclic shifts (e.g., cyclic shift 1 through cyclic shift 6), of the plurality of cyclic shifts, may be allocated to UEs 115 for transmissions using the interlace of resources, as described below. In some aspects, base station 105 may allocate a cyclic shift for the first transmission (e.g., when the resources of the interlace of resources are to be formatted using PUCCH format 2, as described above). Additionally or alternatively, base station 105 may allocate a code for the first transmission (e.g., when the resources of the interlace of resources are to be formatted using PUCCH format 3, as described above).

As further shown in FIG. 7, the method 700 may include receiving a request for resources to be allocated for a second transmission by a UE using the interlace of resources (block 720). For example, base station 105 may receive a request for resources to be allocated for a second transmission by UE 115 using the interlace of resources. In some aspects, base station 105 may receive the request after UE 115 provides the requests.

In some aspects, base station may receive the request from UE 115. For example, UE 115 may send, to base station 105, a BSR for a request of resources for a transmission of information by UE 115. In some aspects, the BSR may include information indicating a size of the payload to be transmitted by UE 115. In some aspects, base station 105 may receive one or more requests corresponding to one or more UEs 115.

As further shown in FIG. 7, the method 700 may include allocating a second code and/or a second cyclic shift to the UE for the second transmission using the interlace of resources (block 730). For example, base station 105 may allocate a second code and/or a second cyclic shift to UE 115 for the second transmission using the interlace of resources. In some aspects, base station 105 may allocate the second code and/or the second cyclic shift to UE 115 after base station 105 allocates the first code and/or the first cyclic shift for the first transmission using the interlace of resources. Additionally or alternatively, base station 105 may allocate the second code and/or the second cyclic shift to UE 115 when base station 105 receives the request for resources to be allocated for the second transmission by UE 115 (e.g., when UE 115 requests resources to be allocated for transmission of control information).

In some aspects, base station 105 may allocate the second code and/or the second cyclic shift based on information stored or accessible by base station 105. For example, base station 105 may store or access information that identifies a plurality of cyclic shifts (e.g., cyclic shift 0 through cyclic shift 6) that may be available for multiplexing transmissions of control information (e.g., using PUCCH format 2) by UEs 115. Base station 105 may also store or access information that identifies a first cyclic shift (e.g., cyclic shift 0), of the plurality of cyclic shifts, allocated for the first transmission (e.g., the channel occupancy transmission) by UEs 115. Here, base station 105 may allocate a second cyclic shift (e.g., cyclic shift 1), of the plurality of cyclic shifts, for a transmission of control information by a UE 115.

As further shown in FIG. 7, process 700 may include allocating a subset of resources, of the interlace of resources, for the second transmission using the interlace of resources (block 740). For example, base station 105 may allocate a subset of resources, of the interlace of resources, for the second transmission using the interlace of resources.

In some aspects, base station 105 may allocate a plurality of subsets of resources, of the interlace of resources, to a plurality of UEs 115 for a plurality of second transmissions using the interlace of resources. For example, the interlace of resources may include ten resources (e.g., ten resource blocks identified as RB0 through RB9), base station 105 may allocate a first cyclic shift (e.g., cyclic shift 0) for the first transmission (e.g., of channel occupancy information) by UEs 115 on the interlace of resources, base station 105 may allocate a second cyclic shift (e.g., cyclic shift 1) to a first UE 115 for transmission of control information on the interlace of resources, and base station 105 may allocate a third cyclic shift (e.g., cyclic shift 2) to a second UE for transmission of control information on the interlace of resources.

In this example, base station 105 may allocate a first subset of resources (e.g., RB0 and RB1), of the interlace of resources, to the first UE for transmission of control information, and may allocate a second subset of resources (e.g., RB2, RB3, and RB4), of the interlace of resources, to the second UE for transmission of control information. In some aspects, the allocation of the subsets of resources may be semi-static (e.g., such that UEs 115 may transmit control information on the assigned resources until UEs 115 are assigned a different subset of resources by base station 105).

In some aspects, base station 105 may allocate the second code and/or the second cyclic shift and/or the subset of resources for transmission of a payload, such as a PUSCH payload (e.g., rather than control information, such as PUCCH information). For example, base station 105 may receive an indication that a UE 115 is to transmit a payload, and a code and/or a cyclic shift, of a plurality of codes and/or cyclic shifts, may not be allocated for transmission of control information by a plurality of UEs 115. Here, base station 105 may allocate the code and/or the cyclic shift to the UE 115 for transmission of the payload. Base station 105 may provide, to the UE 115 in an uplink grant, information indicating that the UE is to transmit the payload in the interlace of resources (e.g., information indicating that the UE 115 is to transmit the payload in the interlace of resources, information identifying the code and/or the cyclic shift to be used for transmission of the payload, etc.). In this way, in some aspects, transmissions of payloads may be multiplexed with transmissions of control information.

As further shown in FIG. 7, the method 700 may include instructing the UE to provide the second transmission in the subset of resources using the second code and/or the second cyclic shift, and the first transmission in other resources using the first code and/or the first cyclic shift (block 750). For example, base station 105 may instruct UE 115 to provide the second transmission in the subset of resources using the second code and/or the second cyclic shift, and the first transmission in other resources using the first code and/or the first cyclic shift.

In some aspects, base station 105 may instruct UE 115 by providing information associated with the first code and/or the first cyclic shift, the second code and/or the second cyclic shift, and/or information associated with an allocated subset of resources to UE 115. Continuing with the above example, and based on receiving such information from base station 105, the first UE 115 may transmit control information in the first subset of resources (e.g., RB0 and RB1) using the second cyclic shift (e.g., cyclic shift 1) and may transmit channel occupancy information in other resources of the interlace of resources (e.g., RB2 through RB9) using the first cyclic shift (e.g., cyclic shift 0). Similarly, the second UE 115 may transmit control information in the second subset of resources (e.g., RB2, RB3, and RB4) using the third cyclic shift (e.g., cyclic shift 2) and may transmit channel occupancy information in the other resources of the interlace of resources (e.g., RB0, RB1, and RB5 through RB9) using the first cyclic shift (e.g., cyclic shift 0). As such, in some aspects, frequency division multiplexing may be achieved between UEs 115 by transmitting control information only in assigned resources using a code and/or cyclic shift allocated for transmission of control information. Moreover, in some aspects, a bandwidth requirement, associated with occupying the unlicensed radio frequency spectrum band, may be satisfied by transmitting channel occupancy information in non-allocated resources of the interlace of resources using a code and/or a cyclic shift allocated for channel occupancy transmissions.

Although FIG. 7 shows example blocks of method 700, in some aspects, the method 700 may include additional blocks, fewer blocks, different blocks, or differently arranged blocks than those illustrated in FIG. 7. Additionally or alternatively, two or more of the blocks of method 700 may be performed in parallel.

Figure 8A:
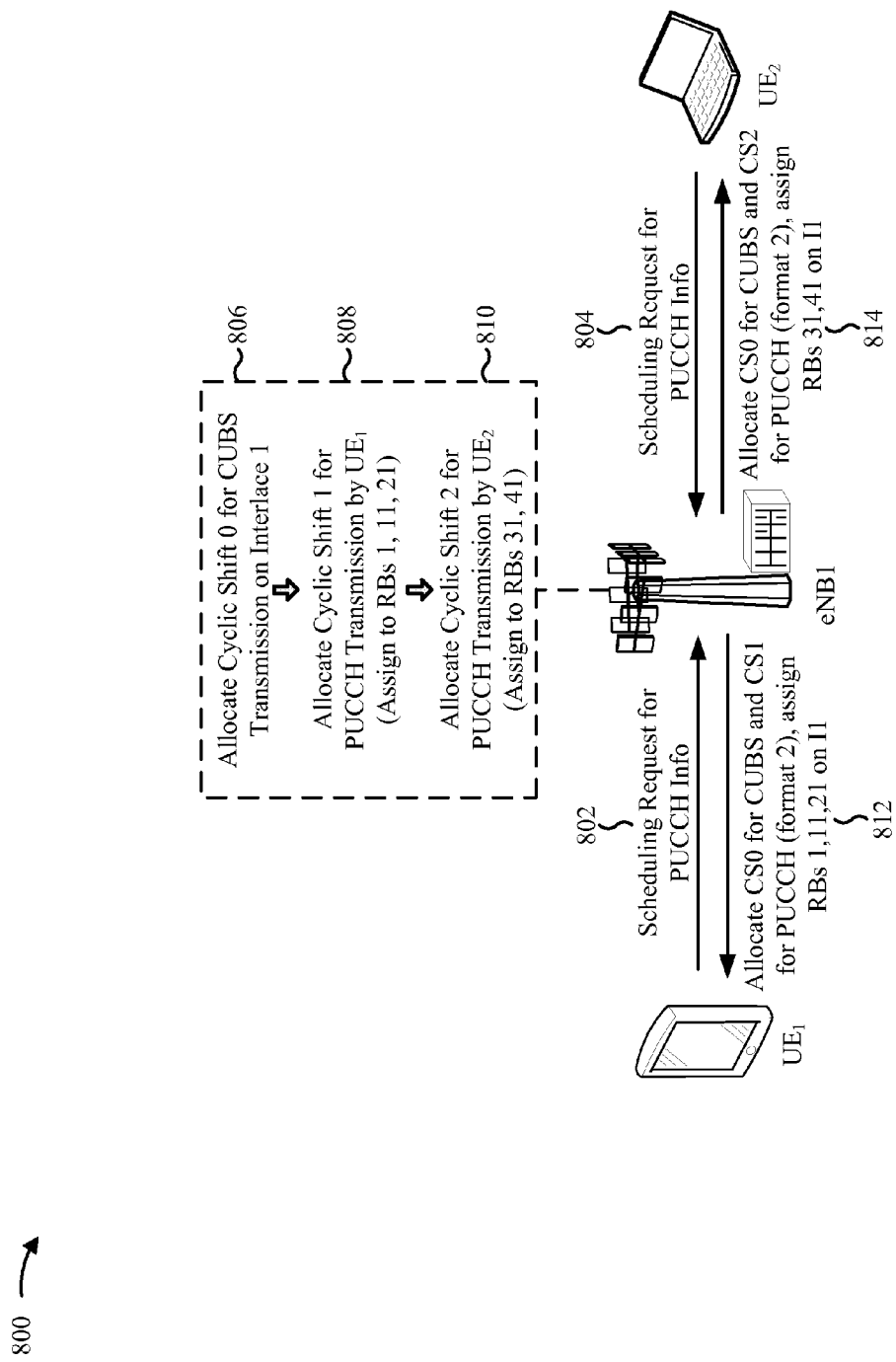
FIGS. 8A and 8B show a diagram illustrating an example relating to the example of the method shown in FIG. 7, in accordance with various aspects of the present disclosure.
Figure 8B:
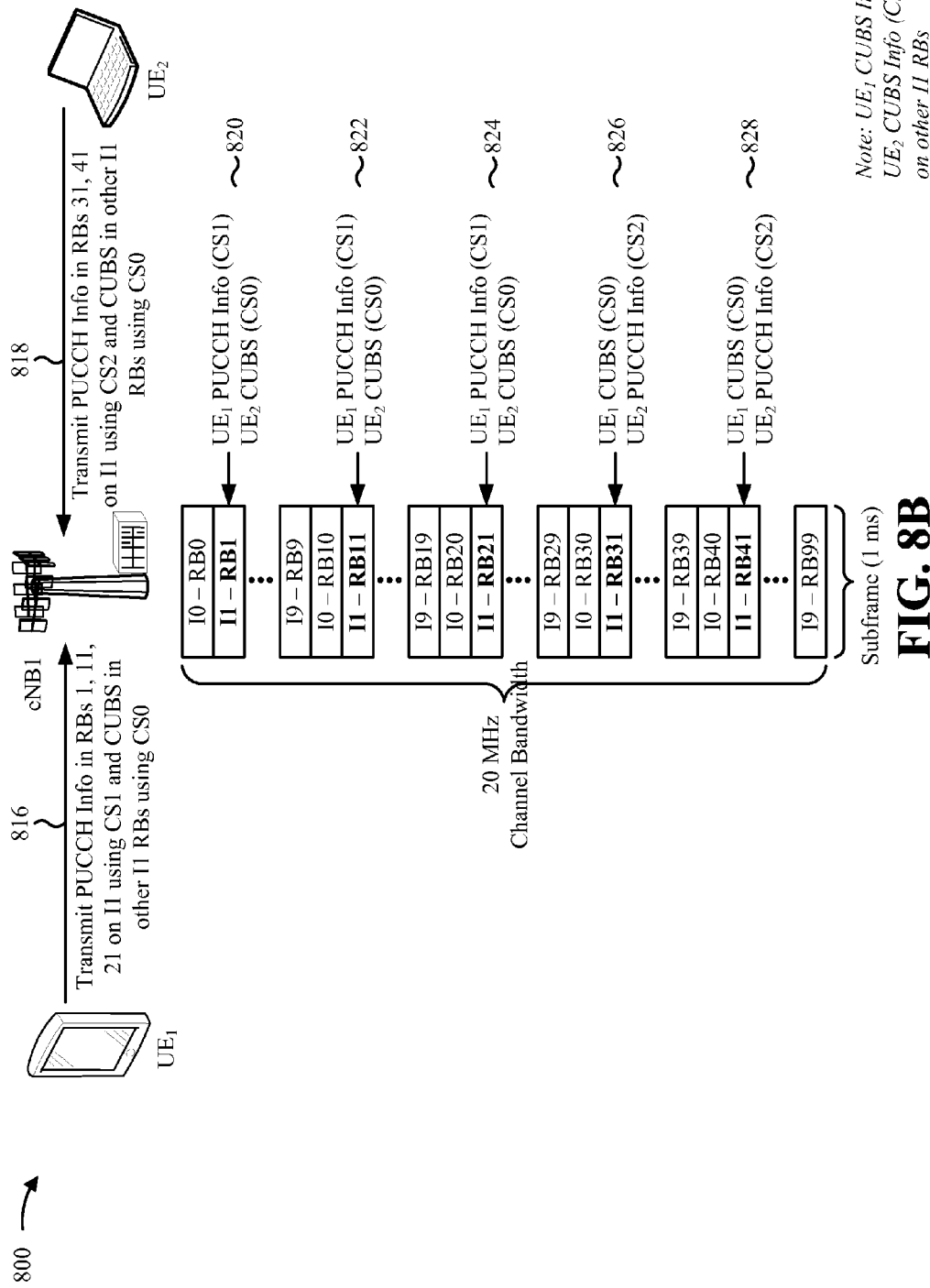

FIGS. 8A and 8B show a diagram 800 illustrating an example relating to the example of the method shown in FIG. 7, in accordance with various aspects of the present disclosure. FIGS. 8A and 8B show an example of determining a first code and/or cyclic shift for a first transmission using an interlace of resources, and allocating a second code and/or a second cyclic shift to UE 115 for another transmission using the interlace of resources. For the purposes of example 800, a plurality of UEs (e.g., $UE_1$ and $UE_2$) may be configured to transmit PUCCH information to a base station (e.g., eNB1) using uplink resources of an unlicensed radio frequency spectrum band.

As shown in FIG. 8A, and by reference number 802, $UE_1$ may provide, to eNB1, a scheduling request for uplink resources to be allocated to $UE_1$ for a transmission of $UE_1$ PUCCH information. Similarly, as shown by reference number 804, $UE_2$ may provide, to eNB1, a scheduling request for uplink resources to be allocated to $UE_2$ for a transmission of $UE_2$ PUCCH information.

For the purposes of example 800, an uplink structure for a subframe (e.g., a 1 ms subframe), associated with uplink transmissions in the unlicensed radio frequency spectrum band (e.g., with a bandwidth of 20 MHz), may include a plurality of uplink resources distributed among a plurality of interlaces of resources (e.g., I0 through I9). Further, eNB1 may determine that interlace of resources I1 is to be used for transmission of PUCCH information by the plurality of UEs, and that PUCCH format 2 is to be used for multiplexing on I1.

As shown by reference number 806, eNB1 may (e.g., based on receiving the $UE_1$ scheduling request and the $UE_2$ scheduling request) allocate a first cyclic shift (cyclic shift 0, since PUCCH format 2 is to be used on I1) for transmission of channel occupancy information (e.g., a CUBS in FIGS. 8A and 8B) on I1. In some aspects, eNB1 may allocate cyclic shift 0 for transmissions of a CUBS in order to allow the plurality of UEs to satisfy a bandwidth requirement associated with the unlicensed radio frequency spectrum band.

As shown by reference number 808, eNB1 may allocate a second cyclic shift (e.g., cyclic shift 1) for transmission of the $UE_1$ PUCCH information by $UE_1$. As further shown, eNB1 may also assign (e.g., based on a size of the $UE_1$ PUCCH information, based on information associated with $UE_1$, etc.) a first subset of resources of I1 (e.g., RB1, RB11, and RB21) to UE1 for the transmission of the $UE_1$ PUCCH information on I1. As shown by reference number 810, eNB1 may allocate a third cyclic shift (e.g., cyclic shift 2) for transmission of the $UE_2$ PUCCH information. As further shown, eNB1 may also assign (e.g., based on a size of the $UE_2$ PUCCH information, based on information associated with $UE_2$, etc.) a second subset of resources of I1 (e.g., RB31 and RB41) to $UE_2$ for the transmission of $UE_2$ PUCCH information on I1.

As shown by reference number 812, eNB1 may provide, to $UE_1$, information indicating $UE_1$ is to transmit the $UE_1$ PUCCH information on RB1, RB11, and RB21 of I1 in PUCCH format 2 using cyclic shift 1, and information indicating that $UE_1$ is to transmit a CUBS on other RBs of I1 using cyclic shift 0. As shown by reference number 814, eNB1 may provide, to $UE_2$, information indicating $UE_2$ is to transmit the $UE_2$ PUCCH information on RB31 and RB41 of I1 in PUCCH format 2 using cyclic shift 2, and information indicating that $UE_2$ is to transmit a CUBS on other RBs of I1 using cyclic shift 0.

As shown in FIG. 8B, and by reference number 816, $UE_1$ may apply cyclic shift 1 to the $UE_1$ PUCCH information, may transmit the shifted $UE_1$ PUCCH information in RB1, RB11, and RB21 of I1, and may transmit a CUBS on other RBs of I1 (e.g., RB31, RB41, RB51, RB61, RB71, RB81, and RB91) using cyclic shift 0. Similarly, as shown by reference number 818, $UE_2$ may apply cyclic shift 2 to the $UE_2$ PUCCH information, may transmit the shifted $UE_2$ PUCCH information in RB31 and RB41 of I1, and may transmit a CUBS on other RBs of I1 (e.g., RB1, RB11, RB21, RB51, RB61, RB71, RB81, and RB91) using cyclic shift 0.

In this way, as shown by the lower portion of FIG. 8B, and by reference numbers 820, 822, and 824, $UE_1$ may transmit (e.g., using cyclic shift 1) the $UE_1$ PUCCH information on RB1, RB11, and RB21 of I1, and $UE_2$ may transmit (e.g., using cyclic shift 0) a CUBS on RB1, RB11, and RB21 of I1. As shown by reference number 826 and reference number 828, $UE_1$ may transmit (e.g., using cyclic shift 0) a CUBS on RB 31 and RB41 of I1, and $UE_2$ may transmit (e.g., using cyclic shift 2) the $UE_2$ PUCCH information on RB31 and RB41 of I1. As noted in FIG. 8B, both $UE_1$ and $UE_2$ may transmit (e.g., using cyclic shift 0) a CUBS on the other RBs of I1 (e.g., RB51, RB61, RB71, RB81, and RB91). In this manner, $UE_1$ and $UE_2$ may both transmit respective PUCCH information on corresponding assigned uplink resources of I1 and may transmit a CUBS in corresponding non-assigned uplink resource of I1. As such, the interlace of resources may be multiplexed for transmissions of PUCCH information by a plurality of UEs while allowing each UE to satisfy a bandwidth requirement associated with occupying the unlicensed radio frequency spectrum band.

As indicated above, FIGS. 8A and 8B are provided merely as an example. Other examples are possible and may differ from what was described with regard to FIGS. 8A and 8B.

Figure 9:
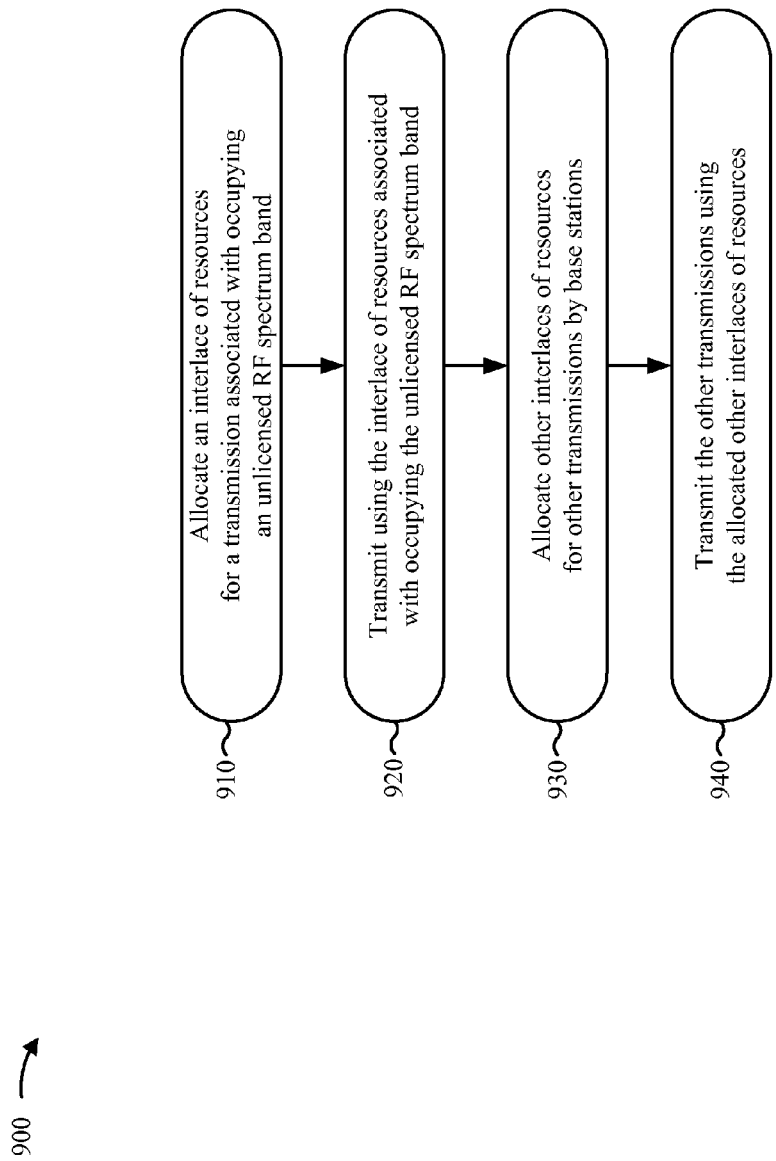
FIG. 9 is a flow chart illustrating an example of a method for allocating different interlaces of resources for a transmission associated with occupying an unlicensed radio frequency spectrum band and a transmission by a base station, in accordance with various aspects of the present disclosure.

FIG. 9 is a flow chart illustrating an example of a method 900 for allocating different interlaces of resources for a transmission associated with occupying an unlicensed radio frequency spectrum band and a transmission by a base station, in accordance with various aspects of the present disclosure. In some aspects, one or more blocks of FIG. 9 may be performed by one or more base stations 105 described with reference to FIG. 1. In some aspects, one or more blocks of FIG. 9 may be performed by another device or a plurality of devices separate from or including the one or more base stations 105, such as UEs 115 described with reference to FIG. 1.

As shown in FIG. 9, the method 900 may include allocating an interlace of resources for a transmission associated with occupying an unlicensed radio frequency spectrum band (block 910). For example, one or more base stations 105 may allocate an interlace of resources for a transmission associated with occupying an unlicensed radio frequency spectrum band. In some aspects, the one or more base stations 105 may allocate the interlace of resources for the transmission associated with occupying the unlicensed radio frequency spectrum band when the one or more base stations 105 communicate with one another, as described below.

In some aspects, the transmission associated with occupying the unlicensed radio frequency spectrum band may be channel occupancy information in the form of a channel usage beacon signal (CUBS). In some aspects, the CUBS may reserve the unlicensed radio frequency spectrum band for use by base stations 105 by providing a detectable energy on the unlicensed radio frequency spectrum band. Additionally or alternatively, the CUBS may also serve to identify a transmitting apparatus (e.g., base station 105) and/or serve to synchronize the transmitting apparatus and a receiving apparatus (e.g., UE 115). Additionally or alternatively, the CUBS may serve to provide an indication to other apparatuses (e.g., base stations 105, UEs 115, Wi-Fi access points 135, Wi-Fi stations 140, etc.) that base station 105 has reserved the channel. In some aspects, the CUBS may be in a form similar to that of an LTE/LTE-A cell-specific reference signal (CRS) or a channel state information reference signal (CSI-RS). In some aspects, the CUBS transmission may serve to occupy at least a certain percentage of an available frequency bandwidth of the unlicensed radio frequency spectrum band and/or to satisfy a regulatory requirement (e.g., the requirement that transmissions over the unlicensed radio frequency spectrum band occupy at least 80% of the bandwidth).

In some aspects, base station 105 may communicate with one or more other base stations 105 (e.g., in geographic proximity to base station 105) in order to allocate the interlace of resources for the transmission associated with occupying the unlicensed radio frequency spectrum band. For example, a first base station 105 may communicate (e.g., via a backhaul portion of a wireless network) with a second base station 105, a third base station 105, and so on, in order to allocate an interlace of resources, of a plurality of interlaces of resources in the unlicensed radio frequency spectrum band, as the interlace of resources for the transmission associated with occupying the unlicensed radio frequency spectrum band. Here, the one or more base stations 105 may communicate in order to provide information that identifies the allocated interlace of resources to each base station 105.

As further shown in FIG. 9, the method 900 may include transmitting using the interlace of resources associated with occupying the unlicensed radio frequency spectrum band (block 920). For example, the one or more base stations 105 may transmit using the interlace of resources associated with occupying the unlicensed radio frequency spectrum band. In some aspects, the one or more base stations 105 may transmit using the interlace of resources associated with occupying the unlicensed radio frequency spectrum band after the one or more base stations 105 allocate the interlace of resources associated with occupying the unlicensed radio frequency spectrum band.

In some aspects, the one or more base stations 105 may transmit channel occupancy information on the interlace of resources for the transmission associated with occupying the unlicensed radio frequency spectrum band. For example, each base station 105 may transmit, on the interlace of resources, a CUBS that includes channel occupancy information (e.g., information that may be ignored, discarded, deleted, or the like, by UEs 115 and/or other base stations 115). In this manner, the one or more base stations 105 may concurrently occupy the unlicensed radio frequency spectrum band using the same interlace of resources.

As further shown in FIG. 9, the method 900 may include allocating other interlaces of resources for other transmissions by base stations (block 930). For example, the one or more base stations 105 may allocate other interlaces of resources for other transmissions by the one or more base stations 105. In some aspects, the one or more base stations 105 may allocate the other interlaces of resources when (e.g., after, before, concurrently with, etc.) the one or more base stations 105 allocate the interlace of resources for the transmission associated with occupying the unlicensed radio frequency spectrum band. Additionally or alternatively, the one or more base stations 105 may allocate the other interlaces of resources for the other transmissions when the one or more base stations 105 receive an indication that the one or more base stations 105 are to allocate the other interlaces of resources for the other transmissions.

In some aspects, another transmission may be a transmission from a base station 105, of the one or more base stations 105, to one or more UEs 115. In some aspects, the one or more base stations 105 may allocate the other interlaces of resources to the base station 115. For example, the unlicensed radio frequency spectrum band may include a plurality of interlaces of resources, and the one or more base stations 105 may allocate a first interlace of resources for the transmission associated with occupying the unlicensed radio frequency spectrum band. In this example, the one or more base stations 105 may communicate in order to allocate a second interlace of resources, of the plurality of interlaces of resources, to a first base station 105, of the one or more base stations 105, and a third interlace of resources, of the plurality of interlaces of resources, to a second base station 105 of the one or more base stations 105.

In this example, the one or more base stations 105 may determine that the first interlace of resources has been allocated for the transmission associated with occupying the unlicensed radio frequency spectrum band, may determine that the second interlace of resources has not been allocated to any base station 105, and may allocate the second interlace of resources to the first base station 105. Similarly, the one or more base stations 105 may determine that the first interlace of resources has been allocated for the transmission associated with occupying the unlicensed radio frequency spectrum band, may determine that the second interlace of resources has been allocated to the first base station 105, may determine that the third interlace of resources has not be allocated to any base station 105, and may allocate the third interlace of resources to the second base station 105. In some aspects, as described in the above example, frequency division multiplexing may be achieved between transmissions to UEs 115 by base stations 105 in geographic proximity.

Additionally or alternatively, time division multiplexing may be achieved between transmissions to UEs 115 by base stations 105 in geographic proximity. For example, the one or more base stations 105 may allocate the other interlace of resources for a transmission by a first base station 105 during a period of time (e.g., associated with a first subframe), and may allocate the other interlace of resources for a transmission by a second base station 105 during another period of time (e.g., associated with a second subframe).

In some aspects, the one or more base stations 105 may allocated an interlace of resources to a base station 105, as described in the above example. Additionally or alternatively, the one or more base stations 105 may allocate an interlaces of resources to a plurality of base stations 105. Additionally or alternatively, the one or more base stations 105 may allocate a plurality of other interlaces of resources to a base station 105.

In some aspects, the one or more base stations 105 may allocate a plurality of resources, associated with the unlicensed radio frequency spectrum band, for the other transmissions. For example, the one or more base stations 105 may allocate a plurality of resources (e.g., a plurality of resource blocks), associated with a subframe, for another transmission by base station 105. In other words, in some aspects, the one or more base stations 105 may allocate a plurality of resources for another transmission rather than allocating an entire interlace of resources for the other transmission.

As further shown in FIG. 9, the method 900 may include transmitting the other transmissions using the allocated interlaces of resources (block 940). For example, the one or more base stations 105 may transmit using the respective other transmissions using the allocated interlaces of resources. In some aspects, the one or more base stations 105 may transmit using the allocated interlaces after the one or more base stations 105 allocate the other interlaces of resources for the other transmissions.

In some aspects, the one or more base stations 105 may transmit on the downlink resources of the allocated interlaces of resources and/or on a subset of downlink resources included in the allocated interlace of resources (e.g., where a quantity of resources in the subset of downlink resources depends on the size of the information to be transmitted by the base station 105).

In some aspects, base stations 105 may transmit on the other interlaces of resources concurrently with transmitting channel occupancy information on the interlace of resources associated with occupying the unlicensed radio frequency spectrum band (e.g., after the one or more base stations 105 allocate the other interlaces of resources for the other transmissions). In this way, the one or more base stations 105 may concurrently occupy the unlicensed radio frequency spectrum band and may transmit to UEs 115 (e.g., on allocated other interlaces of resources) without causing interference between transmissions to UEs 115.

Although FIG. 9 shows example blocks of method 900, in some aspects, the method 900 may include additional blocks, fewer blocks, different blocks, or differently arranged blocks than those illustrated in FIG. 9. Additionally or alternatively, two or more of the blocks of the method 900 may be performed in parallel.

Figure 10A:
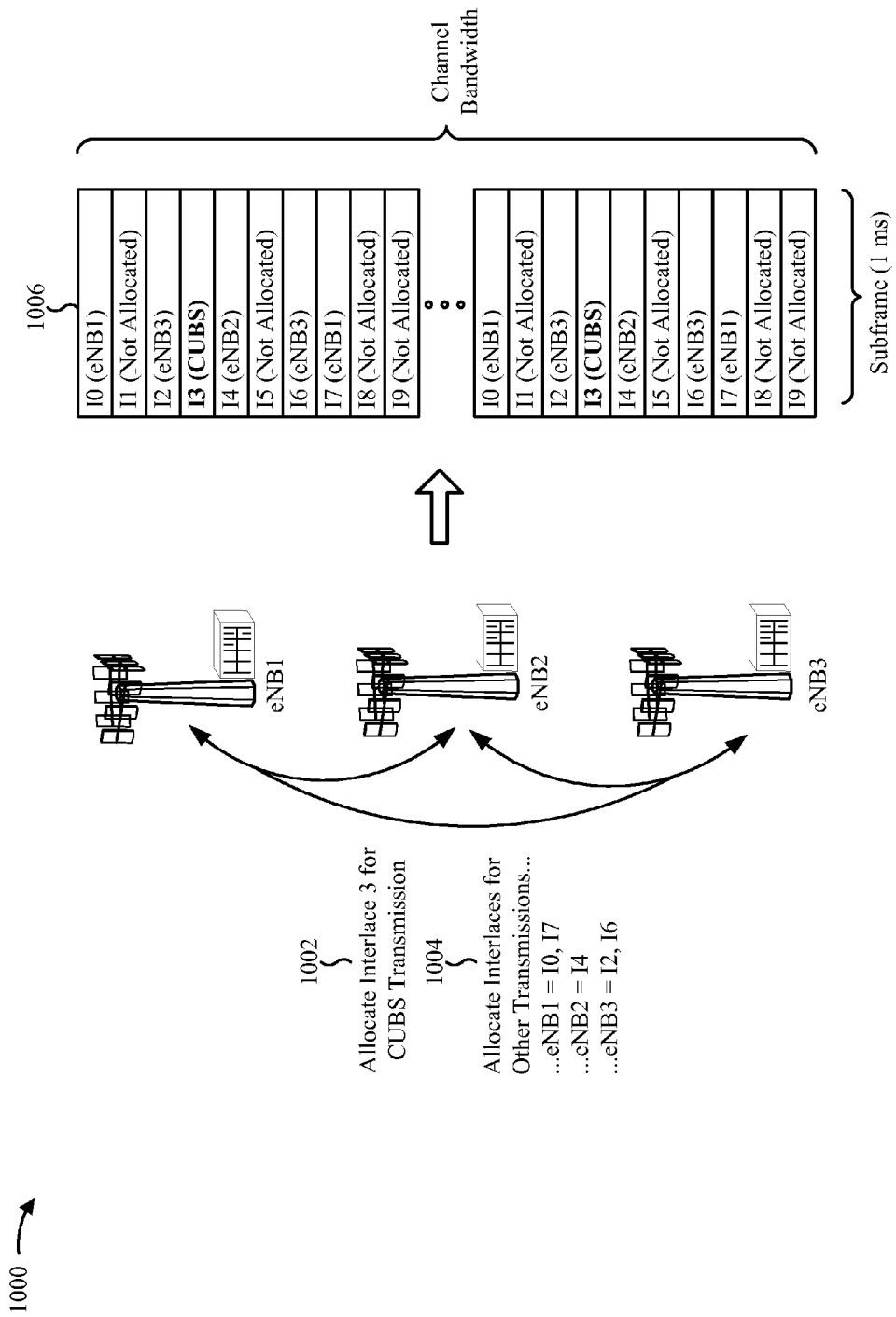
FIGS. 10A and 10B show a diagram illustrating an example relating to the example of the method shown in FIG. 9, in accordance with various aspects of the present disclosure.
Figure 10B:
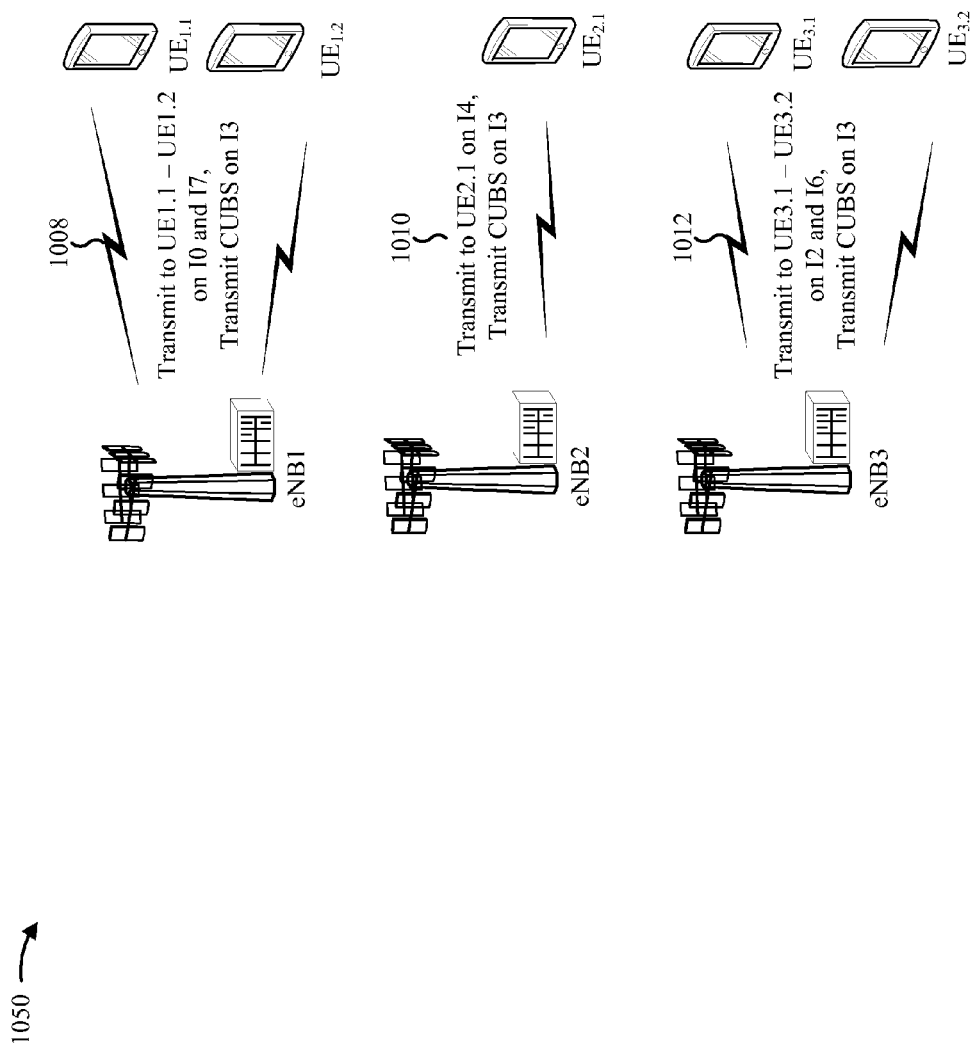

FIGS. 10A and 10B show diagrams 1000 and 1050 illustrating examples relating to the example of the method shown in FIG. 9, in accordance with various aspects of the present disclosure. FIGS. 10A and 10B show an example of allocating a first interlace of resources for a first transmission associated with occupying an unlicensed radio frequency spectrum band, and allocating a second interlace of resources for a second transmission by base station 105 described with reference to FIG. 1.

For the purposes of FIG. 10A and FIG. 10B, a first plurality of UEs 115 (e.g., including $UE_{1.1}$ and $UE_{1.2}$) may be communicating via a first base station 105 (e.g., eNB1) located in a geographic area, a second plurality of UEs 115 (e.g., including $UE_{2.1}$) may be communicating via a second base station 105 (e.g., eNB2) located in the geographic area, and a third plurality of UEs 115 (e.g., $UE_{3.1}$ and $UE_{3.2}$) may be communicating via a third base station 105 (e.g., eNB3) located in the geographic area. Further, eNB1, eNB2, and eNB3 may be configured to transmit information to respective UEs using downlink resources included in an unlicensed radio frequency spectrum band.

As shown by reference number 1002, eNB1, eNB2, and eNB3 may communicate in order to allocate an interlace of resources (e.g., I3) for transmission of channel occupancy information (e.g., a CUBS) associated with occupying the unlicensed radio frequency spectrum band (herein referred to as the CUBS interlace of resources). Based on allocating I3 as the CUBS interlace of resources, each of the eNBs may transmit channel occupancy information on downlink resources of I3. In some aspects, the eNBs may transmit the channel occupancy information on downlink resources of the CUBS interlace of resources in order to satisfy a bandwidth requirement associated with the unlicensed radio frequency spectrum band and/or in order to occupy the unlicensed radio frequency spectrum band. Additionally, the eNBs may concurrently occupy the unlicensed radio frequency spectrum band when the eNBs transmit the channel occupancy information on the downlink resources of I3.

As shown by reference number 1004, the eNBs may then communicate in order to allocate other interlaces of resources (e.g., I0, I1, I2, and I4 through I9) for transmission of other information by the eNBs. For example, as shown, the eNBs may communicate such that a first plurality of interlaces of resources (e.g., I0 and I7) is allocated for transmissions by eNB1, a second plurality of interlaces of resources (e.g., I4) is allocated for transmissions by eNB2, and a third plurality of interlaces of resources (e.g., I2 and I6) is allocated for transmissions by eNB3. The allocation of each interlace of resources (if any) is shown by reference number 1006. As shown, one or more interlaces of resources (e.g., I1, I5, I8, and I9) may not yet be allocated to any eNB.

As shown in FIG. 10B, and by reference number 1008, eNB1 may, based on the allocation of the interlaces of resources, transmit information to $UE_{1.1}$ and $UE_{1.2}$ on I0 and I7, respectively, and may transmit a CUBS on I3. As shown by reference number 1010, eNB2 may, based on the allocation of the interlaces of resources, transmit information to $UE_{2.1}$ on I4, and may transmit a CUBS on I3. As shown by reference number 1012, eNB3 may, based on the allocation of the interlaces of resources, transmit information to $UE_{3.1}$ and $UE_{3.2}$ on I2 and I6, respectively, and may transmit a CUBS on I3. In this way, downlink resources of an unlicensed radio frequency spectrum band may be efficiently used by a plurality of base stations (e.g., concurrently occupying the unlicensed radio frequency spectrum band) by causing the plurality of base stations to transmit channel occupancy information in an interlace of resources of the unlicensed radio frequency spectrum band, and allocating other interlaces of resources among the plurality of base stations.

As indicated above, FIGS. 10A and 10B are provided merely as an example. Other examples are possible and may differ from what was described with regard to FIGS. 10A and 10B.

Aspects of the present disclosure described herein may allow a plurality of UEs to efficiently use resources, included in a single interlace of resources of an unlicensed radio frequency spectrum band, by allowing for multiplexing of information on the single interlace of resources such that the plurality of UEs may concurrently transmit information in the uplink resources of the single interlace of resources. In this manner, power consumption of the plurality of UEs may also be reduced.

Aspects of the present disclosure described herein may also, or alternatively, allow resources of an unlicensed radio frequency spectrum band to be efficiently used by a plurality of base stations (e.g., concurrently occupying the unlicensed radio frequency spectrum band) by causing the plurality of base stations to transmit channel occupancy information in an interlace of resources associated with occupying the unlicensed radio frequency spectrum band, and allocating other interlaces of resources among the plurality of base stations.

In some aspects, techniques associated with the methods 500, 700, and/or 900 may be combined in order to manage transmissions (e.g., uplink and/or downlink transmissions) in an unlicensed radio frequency spectrum band. Additionally, while some aspects may be described in the context of transmission of a type information (e.g., transmission of a payload in the context of the method 500, transmission of control information in the context of the method 700, etc.), such aspects may also apply to transmissions of one or more other types of information (e.g., transmission of control information in the context of the method 500, transmission of a payload in the context of the method 700, etc.).

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, and/or a combination of hardware and software. As used herein, the term processor may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some aspects, such a processor may be implemented in hardware, firmware, or a combination of hardware and software.

Some aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that techniques described herein, may be implemented in different forms of hardware, firmware, or a combination of hardware and software. The actual specialized control hardware or software code used to implement these techniques is not limiting of the aspects. Thus, the operation and behavior of the techniques were described herein without reference to specific software code—it being understood that software and hardware can be designed to implement the techniques based on the description herein.

Even though combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for wireless communications, comprising:
    determining sizes of payloads of one or more user equipment (UEs);
    determining whether to multiplex the payloads of the one or more UEs based on the sizes of the payloads; and
    allocating at least one of one or more codes or one or more cyclic shifts to the one or more UEs to transmit the payloads on a single interlace of resources based on the determination to multiplex the payloads of the one or more UEs.

2. The method of claim 1, wherein determining whether to multiplex the payloads based on the sizes of the payloads includes:
    determining whether the sizes of the payloads satisfy a payload size threshold.

3. The method of claim 1, wherein allocating the at least one of the one or more codes or the one or more cyclic shifts to the one or more UEs includes:
    allocating at least two codes or cyclic shifts to a single UE, of the one or more UEs, to transmit corresponding payloads using at least two codes or cyclic shifts.

4. The method of claim 1, wherein the payloads are code division multiplexed on the single interlace of resources using at least two codes of the one or more codes.

5. The method of claim 1, wherein the payloads are multiplexed on the single interlace of resources using at least two cyclic shifts of the one or more cyclic shifts.

6. The method of claim 1, wherein the single interlace of resources comprises a plurality of uplink resources that are structured to allow each UE, of the one or more UEs, to transmit bits in the single interlace of resources, using the at least one of the one or more codes or the one or more cyclic shifts.

7. The method of claim 1, wherein the one or more codes are one or more Walsh codes.

8. The method of claim 1, further comprising:
    determining a transport block size (TBS) based on a modulation and coding scheme (MCS) and a total quantity of the at least one of the one or more codes or the one or more cyclic shifts.

9. The method of claim 1, wherein the single interlace of resources comprises a plurality of uplink resources that are structured using physical uplink control channel (PUCCH) format 2.

10. The method of claim 1, wherein the single interlace of resources comprises a plurality of uplink resources that are structured using physical uplink control channel (PUCCH) format 3.

11. The method of claim 1, wherein allocating the at least one of the one or more codes or the one or more cyclic shifts to the one or more UEs comprises:
    instructing the one or more UEs to transmit the payloads on the single interlace of resources using a radio resource control (RRC) signal.

12. The method of claim 1, wherein allocating the at least one of the one or more codes or the one or more cyclic shifts to the one or more UEs comprises:
    instructing the one or more UEs to transmit the payloads on the single interlace of resources using a downlink grant.

13. The method of claim 1, wherein cyclic redundancy check (CRC) information, associated with transmitting a payload, of the payloads, includes a quantity of bits that is less than twenty-four bits.

14. The method of claim 1, wherein the single interlace of resources is included in a channel of an unlicensed spectrum.

15. A method for wireless communications, comprising:
    determining a first code or a first cyclic shift used for a first transmission, wherein the first transmission is transmitted using an interlace of resources; and
    allocating a plurality of second codes or a plurality of second cyclic shifts to one or more user equipment (UEs) for a second transmission, wherein the second transmission is multiplexed with the first transmission on the interlace of resources.

16. The method of claim 15, wherein allocating the plurality of second codes or the plurality of second cyclic shifts to the one or more UEs for the second transmission comprises:
    instructing a UE, of the one or more UEs, to transmit physical uplink control channel (PUCCH) information or to transmit physical uplink shared channel (PUSCH) on an uplink resource included in the interlace of resources.

17. The method of claim 15, further comprising:
allocating the first code or the first cyclic shift for transmission of channel occupancy information on the interlace of resources; and
instructing the one or more UEs to transmit the channel occupancy information on the interlace of resources using the first code or the first cyclic shift.

18. The method of claim 15, further comprising:
instructing a UE, of the one or more UEs, to transmit channel occupancy information on a first subset of uplink resources of the interlace of resources; and
allocating a second subset of uplink resources, of the interlace of resources, to the UE for transmission of information,
the first subset of uplink resources being different than the second subset of uplink resources.

19. The method of claim 18, wherein instructing the UE to transmit the channel occupancy information on the first subset of uplink resources comprises:
instructing the UE to transmit the channel occupancy information on the first subset of uplink resources using the first code or the first cyclic shift.

20. The method of claim 18, wherein instructing the UE to transmit the channel occupancy information on the first subset of uplink resources causes a bandwidth requirement, associated with a channel that includes the interlace of resources, to be satisfied.

21. The method of claim 15, wherein uplink resources, of the interlace of resources, are structured using PUCCH format 2.

22. The method of claim 15, wherein uplink resources, of the interlace of resources, are structured using PUCCH format 3.

23. A base station for wireless communication, the base station comprising:
one or more processors to:
determine sizes of payloads of one or more user equipment (UEs);
determine whether to multiplex the payloads of the one or more UEs based on the sizes of the payloads; and
allocate at least one of one or more codes or one or more cyclic shifts to the one or more UEs to transmit the payloads on a single interlace of resources based on the determination to multiplex the payloads of the one or more UEs.

24. The base station of claim 23, wherein the one or more processors, when determining whether to multiplex the payloads based on the sizes of the payloads, are further to:
determine whether to multiplex the payloads based on whether the sizes of the payloads satisfy a payload size threshold.

25. The method of claim 15, wherein the interlace of resources is included in a channel of an unlicensed spectrum or in a channel associated with a long term evolution (LTE) network.

26. The base station of claim 23, wherein the one or more processors, when allocating the at least one of the one or more codes or the one or more cyclic shifts to the one or more UEs, are further to:
allocate at least two codes or cyclic shifts to a single UE, of the one or more UEs, to transmit corresponding payloads using at the at least two codes or cyclic shifts.

27. The base station of claim 23, wherein the payloads are code division multiplexed on the single interlace of resources using at least two codes of the one or more codes.

28. The base station of claim 23, wherein the payloads are multiplexed on the single interlace of resources using at least two cyclic shifts of the one or more cyclic shifts.

* * * * *